United States Patent
Bruce et al.

(10) Patent No.: US 9,102,110 B2
(45) Date of Patent: Aug. 11, 2015

(54) SYSTEMS AND METHODS FOR REMOVING LENSES FROM LENS MOLDS

(75) Inventors: Ian Bruce, Southampton (GB); Sarah L. Almond, Eastleigh (GB); Philip A. Brame, Southampton (GB); Geoffrey A. Blyth, Southampton (GB); Eve Blyth, legal representative, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 1790 days.

(21) Appl. No.: 11/201,410

(22) Filed: Aug. 9, 2005

(65) Prior Publication Data

US 2007/0035049 A1   Feb. 15, 2007

(51) Int. Cl.
*B29D 11/00* (2006.01)
*B29L 11/00* (2006.01)

(52) U.S. Cl.
CPC ...... *B29D 11/0024* (2013.01); *B29D 11/00221* (2013.01); *B29L 2011/0041* (2013.01)

(58) Field of Classification Search
CPC ............... B29D 11/00221; B29D 11/0024; B29L 2011/0041
USPC ........................................................ 264/2.6
See application file for complete search history.

(56) References Cited

U.S. PATENT DOCUMENTS

| | | | |
|---|---|---|---|
| 3,882,036 A * | 5/1975 | Krezanoski et al. | 510/112 |
| 3,935,291 A | 1/1976 | Jackson | |
| 4,042,652 A | 8/1977 | Feneberg | |
| 4,121,896 A | 10/1978 | Shepherd | |
| 4,495,313 A | 1/1985 | Larsen | |
| 4,497,754 A * | 2/1985 | Padoan | 264/1.38 |
| 4,565,348 A | 1/1986 | Larsen | |
| 4,640,489 A | 2/1987 | Larsen | |
| 4,680,336 A * | 7/1987 | Larsen et al. | 524/548 |

(Continued)

FOREIGN PATENT DOCUMENTS

| EP | 0528664 A1 | 2/1993 |
|---|---|---|
| EP | 0799689 A2 | 10/1997 |

(Continued)

OTHER PUBLICATIONS

U.S. Appl. No. 11/200,848, filed Aug. 9, 2005.

(Continued)

*Primary Examiner* — Alison Hindenlang
(74) *Attorney, Agent, or Firm* — Stout, Uxa & Buyan, LLP; Frank J. Uxa

(57) ABSTRACT

Methods and apparatus for separating mold sections, removing a lens product from the separated mold sections, and transferring the lens product to a processing tray are provided and include contacting assembled mold sections with a warm fluid to break fused portions between the mold sections, and using one or more wedge shaped elements to pry apart and separate the mold sections, one from the other. A vacuum head having multiple vacuum ports is employed for lifting the newly molded lens product from a mold section and for releasing the lens from the vacuum head into a processing tray. A cylinder of flowing air directed around the circumference of the lens is effective to maintain the lens in an unfolded position as the lens is being released into the processing tray. A tray set including multiple trays holding multiple lenses is provided and includes features for enabling visual and/or mechanical distinction of the trays and lenses held thereby.

11 Claims, 11 Drawing Sheets

(56) References Cited

U.S. PATENT DOCUMENTS

| | | | |
|---|---|---|---|
| 4,889,664 A | 12/1989 | Kindt-Larsen et al. | |
| 4,944,899 A * | 7/1990 | Morland et al. | 264/1.36 |
| 5,039,459 A | 8/1991 | Kindt-Larsen et al. | |
| 5,080,839 A | 1/1992 | Kindt-Larsen | |
| 5,094,609 A | 3/1992 | Kindt-Larsen | |
| 5,114,455 A | 5/1992 | Hirota et al. | |
| 5,158,718 A | 10/1992 | Thakrar et al. | |
| 5,204,126 A | 4/1993 | Singh et al. | |
| 5,407,627 A | 4/1995 | Schiller et al. | |
| 5,540,410 A | 7/1996 | Lust et al. | |
| 5,561,970 A | 10/1996 | Edie et al. | |
| 5,620,635 A * | 4/1997 | DeRozier et al. | 264/2.5 |
| 5,690,866 A | 11/1997 | Andersen et al. | |
| 5,693,268 A * | 12/1997 | Widman et al. | 264/1.1 |
| 5,804,107 A | 9/1998 | Martin et al. | |
| 5,850,107 A | 12/1998 | Kindt-Larsen et al. | |
| 5,895,192 A | 4/1999 | Parnell, Sr. et al. | |
| 5,935,492 A | 8/1999 | Martin et al. | |
| 6,033,603 A | 3/2000 | Lesczynski et al. | |
| 6,039,899 A | 3/2000 | Martin et al. | |
| 6,071,439 A | 6/2000 | Bawa et al. | |
| 6,143,210 A * | 11/2000 | Wrue et al. | 264/1.36 |
| 6,180,032 B1 | 1/2001 | Parnell, Sr. et al. | |
| 6,183,705 B1 | 2/2001 | Chang | |
| 6,193,369 B1 * | 2/2001 | Valint et al. | 351/160 H |
| 6,288,852 B1 | 9/2001 | Cameron | |
| 6,310,116 B1 | 10/2001 | Yasuda et al. | |
| 6,315,929 B1 | 11/2001 | Ishihara et al. | |
| 6,405,993 B1 | 6/2002 | Morris | |
| 6,419,859 B2 * | 7/2002 | Tanaka et al. | 264/1.1 |
| 6,428,723 B1 | 8/2002 | Lesczynski et al. | |
| 6,444,145 B1 | 9/2002 | Clutterbuck | |
| 6,511,617 B1 | 1/2003 | Martin et al. | |
| 6,551,531 B1 | 4/2003 | Ford et al. | |
| 6,565,776 B1 | 5/2003 | Li et al. | |
| 6,627,124 B1 | 9/2003 | Herbrechtsmeier et al. | |
| 6,638,362 B2 | 10/2003 | Dobner et al. | |
| 6,638,451 B1 | 10/2003 | Hagmann et al. | |
| 6,719,929 B2 | 4/2004 | Winterton et al. | |
| 6,790,873 B2 | 9/2004 | Tomono et al. | |
| 2002/0016383 A1 * | 2/2002 | Iwata et al. | 523/106 |
| 2002/0069896 A1 * | 6/2002 | Pankow | 134/6 |
| 2002/0185763 A1 | 12/2002 | Pegram et al. | |
| 2003/0062640 A1 | 4/2003 | Ansell et al. | |
| 2003/0160343 A1 | 8/2003 | Hodgkinson | |
| 2003/0164562 A1 | 9/2003 | Li et al. | |
| 2003/0164563 A1 | 9/2003 | Calvin et al. | |
| 2003/0197833 A1 | 10/2003 | Hiratani et al. | |
| 2004/0000732 A1 | 1/2004 | Spaulding et al. | |
| 2004/0074525 A1 * | 4/2004 | Widman et al. | 134/34 |
| 2005/0062179 A1 * | 3/2005 | Rastogi et al. | 264/1.1 |
| 2006/0186564 A1 * | 8/2006 | Adams et al. | 264/1.32 |
| 2006/0202368 A1 * | 9/2006 | Matsuzawa et al. | 264/1.32 |

FOREIGN PATENT DOCUMENTS

| | | |
|---|---|---|
| EP | 0824063 A2 | 2/1998 |
| JP | 5-212796 A | 8/1993 |
| JP | 10-58456 A | 3/1998 |
| JP | 2003-517503 A | 5/2003 |
| JP | 2004-299222 A | 10/2004 |
| JP | 2005-513173 A | 5/2005 |
| WO | WO 95/11789 | 5/1995 |
| WO | WO 00/71611 A1 | 11/2000 |
| WO | WO 03/022322 A2 | 3/2003 |

OTHER PUBLICATIONS

U.S. Appl. No. 11/200,648, filed Aug. 9, 2005.
U.S. Appl. No. 11/200,644, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.
U.S. Appl. No. 60/604,961, filed Aug. 27, 2004.
U.S. Appl. No. 60/621,525, filed Oct. 22, 2004.
Partial European Search Report in related European Application No. EP 06016469 dated May 21, 2010.
European Search Report dated Oct. 12, 2010 in related European Application No. EP 06016469.

* cited by examiner

SYSTEMS AND METHODS FOR REMOVING LENSES FROM LENS MOLDS

The present invention generally relates to the production of ophthalmic lenses, and more specifically relates to apparatus and methods for removing molded hydrogel contact lenses and the like, from the individual mold sections in which they are produced, and apparatus and methods for holding the removed contact lenses during processing of the lenses with one of more fluids.

BACKGROUND

As the ophthalmic lens industry has grown, it has become desirable to supply contact lenses that are periodically and frequently replaced to minimize the possibility of user induced contamination. This has produced an opportunity for manufacturers to strive for automated methods and apparatus that are able to automatically produce high quality ophthalmic lenses in a cost-effective and highly efficient manner.

It is current practice in the art of making ophthalmic lenses, such as soft contact lenses of the hydrogel type, to form a monomer or monomer mixture that may be polymerized in a plastic mold. Details of typical direct mold processes for forming soft hydrogel contact lenses can be found in U.S. Pat. Nos. 5,080,839, 5,039,459, 4,889,664, and 4,495,313, the entire disclosure of each of these patents being incorporated herein by this specific reference.

The process for forming soft contact lenses as generally described in the abovementioned patents includes the steps of dissolving a monomer mixture in a non-aqueous, water-displaceable solvent and placing the monomer/solvent mixture in a mold having the shape of the final desired hydrogel lens. Next, the monomer/solvent mixture is subjected to conditions whereby the monomer(s) polymerize, to thereby produce a polymer/solvent mixture in the shape of the final desired hydrogel lens. After the polymerization is complete, the solvent is displaced with water to produce a hydrated lens whose final size and shape are similar to the shape of the original molded polymer/solvent article.

Examples of typical plastic molds used for carrying the polymerizable mixture are disclosed in U.S. Pat. Nos. 5,094,609, 4,565,348, 4,640,489 and 4,121,896, the entire disclosure of each of these patents being incorporated herein by this specific reference. The mold disclosed in U.S. Pat. No. 4,640,489 is a two-piece mold with a female mold portion having a generally concave lens surface, and a male mold portion having a generally convex lens surface, both mold portions preferably made of a thermoplastic material such as polystyrene. As discussed in U.S. Pat. No. 4,640,489, polystyrene and copolymers thereof is a preferred mold material because these materials do not crystallize during cooling from the melt, and exhibit little or no shrinkage when subject to the processing conditions required during the direct molding process discussed above. Alternatively, molds made of polypropylene or polyethylene, such as described in U.S. Pat. No. 4,121,896 may be used.

During the molding process, the monomer and monomer mixture is supplied in excess to the female concave mold portion prior to the mating of the molds. After the mold portions are placed together, defining the lens and forming a lens edge, the excess monomer or monomer mixture is expelled from the mold cavity and rests on or between flanges that surround one or both mold portions. Upon polymerization this excess material forms an annular ring around the formed lens between the flange portions of the molds.

As discussed in the above-mentioned U.S. Pat. Nos. 5,039,459, 4,889,664, and 4,565,348, it is important that the materials, chemistry, and processes be controlled so that the mold portions may be effectively separated without having to apply undue force, which may be necessary when the lens adheres to one or more of the lens mold portions or when the lens mold portions have become adhered to each other by the HEMA ring after polymerization.

Typical prior art processes for separating the mold portions and removing the lens therefrom consist of a heating stage, a prying stage and a lens removal stage. The heating stage of the prior art lens removal process usually involves applying heat to the back mold portion by applying a heated air stream to the mold. The differential expansion between the heated mold polymer and the cooler lens polymer shifts one surface with respect to the other. During the prying stage, a side pry bar is jammed between the molds from one side, and the back curve mold is pried to pivot the back curve mold upwardly from one side. The prying force then breaks the polymerized lens/polymer mold adhesion and separates the mold portions.

Martin et al., U.S. Pat. No. 5,935,492, which is incorporated herein in its entirety by this specific reference, discloses a method for demolding ophthalmic lenses using mechanical leverage and a predetermined pattern of motion to gradually pry lens mold sections apart from one another.

It has been recognized, such as disclosed in U.S. Pat. No. 5,850,107, which is incorporated herein in its entirety by this reference, that when there exists a temperature gradient between the mold halves and the lens, there is less an adhesion force existing between the lens and the mold surfaces. It has been suggested that this effect is most significant when there is a maximum thermal gradient between the mold halves and the lens. Generally, lower thermal gradients created between the mold halves and the lens will require a greater force to separate the mold portions resulting in increased possibility of damaging a lens or fracturing a mold portion.

Techniques have therefore been proposed that are directed toward heating a mold section to create a temperature gradient in order to facilitate the demolding process. For example, U.S. Pat. No. 5,850,107 describes a process including applying hot steam to a back curve mold half to form such a temperature gradient and prying the mold sections apart.

A conventional approach to removing a contact lens from a mold section, or mold cup, of a newly separated mold assembly, employs the use of a vacuum head. The vacuum head is placed into contact with the exposed side of the contact lens and vacuum is drawn through a single hole therein. The vacuum contacts a minor portion, that is less than 50%, of the area of the surface facing the vacuum head. Vacuum is often applied using a motorized constant vacuum machine. Using such a conventional vacuum system runs a substantial risk of damaging the contact lens and allowing liquid from or in contact with the lens to enter into the vacuum system, placing an added burden on such system.

Cameron U.S. Pat. No. 6,288,852 discloses a method and apparatus for retaining a contact lens in a fixed position to allow coloring of the lens. The mounting assembly disclosed in this patent includes a surface on which the contact lens is fixed with the assistance of a vacuum created by a vacuum pump. The vacuum passes through the mounting assembly and through a plurality of small capillaries in the surface. This patent does not disclose or suggest removing a contact lens from a molding cup.

Conventional polymeric contact lens manufacturing and processing techniques require recently formed lenses to be further processed before final packaging of the lenses. For example, newly formed contact lenses are subjected to extraction and hydration procedures using one or more fluids, for example, liquids. To illustrate, newly formed polymeric contact lenses often contain unreacted monomers which are removed by extracting the monomers from the lens with a liquid medium, such as a non-aqueous liquid medium. After the extraction processing, the contact lens is contacted with an aqueous liquid medium to hydrate the lens, for example, to swell the lens with water.

During such fluid processing, the lenses can become damaged, for example, by the fluid processing itself and/or as the lenses are moved between processing steps. In addition, since a large number of different contact lenses, for example, contact lenses having one or more of different base curves, different refractive powers, different overall diameters, different cylinder corrections, if any, and the like differences, are often processed at the same time, such lenses can be misidentified after the processing. Such misidentified lenses can result in added manufacturing costs, higher lens discard rates, and even mislabeling of the final lens product and/or providing the wrong lens to the ultimate consumer, the lens wearer.

There is still a need for more effective methods and systems for demolding contact lenses, especially silicone hydrogel contact lenses. For example, it would improve the simplicity and the efficiency of the automated production of hydrogel lenses if the demolding process included steps for reliably controlling which mold section, i.e. which one of either the male mold section or the female mold section, would contain the molded lens product upon separation of the mold sections. In addition, there is a need for apparatus and methods for facilitating removal of recently formed contact lenses from mold sections and apparatus and methods for placing such removed lenses onto holders useful for downstream lens processing steps, for example, extraction and hydration processing steps.

SUMMARY OF THE INVENTION

Systems, apparatus and methods useful for demolding contact lens mold assemblies, and removing newly formed contact lenses, for example, at least partially hydrated contact lenses, from molding cups have been discovered.

Accordingly, in one aspect, the present invention provides apparatus and methods for separating sections of an assembled ophthalmic lens mold assembly, and in another aspect, the present invention provides apparatus and methods for removing a newly formed lens product or lens shaped article from a mold section and transferring the lens product to a processing tray. In yet another aspect of the invention, trays and tray assemblies are providing for holding newly formed lens products during downstream processing steps such as extraction and hydration.

In the context of the present description of embodiments of the invention, a "mold assembly" as the term is typically used hereinafter, is an ophthalmic lens mold assembly including a first mold section having a first lens defining surface, a second mold section, assembled to, for example, fused to, the first mold section and having a second lens defining surface, and a lens shaped article, for example a polymerized contact lens product, disposed between the first lens defining surface and the second lens defining surface.

Methods for separating or decoupling sections of a mold assembly, in accordance with the present invention, generally comprise the steps of contacting a mold assembly with a fluid, for example water, at an elevated temperature, removing the mold assembly from the fluid, and passing a wedge between the first mold section and the second mold section to cause a break or separation of bonded material between the first and second mold sections. In some embodiment, the step of contacting with a fluid comprises immersing the mold assembly into a warm water bath, for example, having a temperature in a range of about 60° C. to about 90° C., more particularly, about 70° C. to about 80° C. In an especially effective embodiment, the warm water bath has a temperature of about 75° C. The mold assembly remains immersed in the water bath for a period sufficient to initiate or cause separation of the mold sections. For example, the mold assembly may remain in the warm water bath for about ten seconds, and in a specific embodiment, the mold assembly remains in a water bath of about 75° C. for about 7 seconds and is then removed therefrom and is then transferred to a prying stage.

The methods may optionally include the step of cooling at least one of the first mold section and the second mold section prior to the step of contacting with the fluid. In some instances, this optional step will function to facilitate retention of the lens shaped article by a predetermined one of the first mold section and the second mold section. For example, in some embodiments, the step of cooling may include cooling or freezing only one of the first mold section and the second mold section to facilitate retention of the lens on a predetermined mold section. The selection of which mold section to cool or freeze may be, at least in part, dependent upon the type material of which the mold sections are made. The cooled or frozen mold section may comprise the mold section on which it is preferred that the lens be retained.

The methods of the invention may further comprise separating mold sections, one from the other, after the step of contacting with fluid. For example, mechanical means may be utilized to split or pry the mold sections apart from one another thereby exposing the lens shaped article while it is retained by one of the mold sections, for example, the predetermined mold section. Steps may then be taken to effect release of the lens shaped article from the mold section which had been retaining the lens shaped article.

For purposes of the present disclosure, by "predetermined mold section" is usually meant the one mold section, selected from the first mold section and the second mold section, to be the mold section that is selected to retain the contact lens shaped article upon the physical separation of the first mold section from the second mold section.

In one embodiment of the invention, the optional step of cooling includes applying an agent, for example a cooling agent or a freezing agent, to one of the first mold section and the second mold section. The agent generally comprises a suitable composition or material that can be readily applied to one of the mold sections and acts to draw heat therefrom. The agent may comprise, for example liquid nitrogen.

In some embodiments, the agent is applied to the predetermined mold section. The agent effectively draws heat from the mold section and causes the lens shaped article to become more firmly adhered to the lens shaped surface of the predetermined mold section.

For example, the agent may be applied to an outer surface of one of the mold sections, for example, the predetermined mold section, in the form of a spray. Preferably, the step of cooling comprises cooling the mold section, more preferably freezing the mold section, to achieve a desired temperature thereof of between about 0° C. to about −200° C.

In some embodiments of the invention, after the cooling step, preferably while the cooled mold section is substantially within the desired temperature range, heat is applied to the mold assembly. Typically, in accordance with the present invention, this step involves immersing at least a portion of the mold assembly in a fluid, for example a liquid, for example, deionized water or other suitable aqueous fluid.

Preferably, the fluid is at a temperature of up to, but preferably not exceeding about 100° C. For example, the fluid may comprise deionized water having a temperature of between about 20° C. and about 95° C. In order to reduce the amount of time the mold assembly must remain in the fluid for the step of heating to be effective in decoupling the mold assembly, ultrasonic energy may be transmitted through the fluid. Alternatively, the step of heating the mold assembly may comprise applying steam to the mold assembly, or other means of heating the mold assembly to accomplish the objective of facilitating decoupling, for example, reducing adhesion between the lens shaped article and the lens shaped surface of the other mold section.

After the step of contacting the mold assembly with a fluid at an elevated temperature, the mold assembly is then subjected to a step of physically separating, splitting or prying apart the first mold section from the second mold section. This step may be accomplished in any suitable manner that will cause opening of the mold assembly or physical separation of the mold sections while allowing the lens shaped article to remain temporarily fixed to only one of the mold sections, for example, the predetermined mold section.

For example, in one embodiment of the invention, the separating stage involves placing the mold assembly in contact with one or more wedge shaped elements, for example, between two wedge shaped elements, with edges of the wedge shaped elements wedged between interfacing peripheral portions of the first mold section and the second mold section. The mold assembly is then forced apart by moving the mold assembly along the wedge shaped elements, specifically from a thinner edge to a thicker edge of the wedge shaped element or elements, in order to pry the mold sections apart one from the other. Once the mold sections are separated, the lens shaped article now remains on the lens shaped surface of one of the mold sections, for example, the mold section having a concave lens shaped surface.

In some embodiments, the step of separating the mold sections may be accomplished using a non-linear element. For example, rather than the opposing linear wedge shaped elements described elsewhere herein, it is contemplated that embodiments of the invention may include a revolving, circular element, for example, a somewhat spiral wedge shaped element, for example, a spiral blade sized to receive an arcuate circumferential region of the mold assembly within a central region of the blade. The spiral blade may be defined by an increasing thickness which is effective to cause the mold sections to be separated as the perimeter of the spiral element is rotated about the circumferential region of the mold assembly. Other wedge-like devices are also contemplated and are considered to be within the scope of the present invention.

The method may further include an optional step of decoupling or unfusing fused regions between the mold sections by passing a cutting device, for example, a sharp implement having an edge at an elevated temperature, between the mold sections. This step is generally performed prior to the step of prying apart the mold sections as described hereinabove, using one or more wedge shaped elements.

In some embodiments, the decoupling step may include placing the mold assembly in a nest that secures the mold assembly and thereafter rotating the mold assembly with one or more knives, blades or other cutting implements located between the mold sections, while the cutting implements pass between the rotating mold assembly.

More specifically, while the mold assembly is secured in the nest, one or more blades, for example, heated blades, are caused to enter the mold assembly between the mold sections. An actuator may then rotate the secured molding assembly, for example, in a clockwise direction, to cause the blade or blades to cut through fused regions bonding the mold sections. The blade or blades are then retracted and the molding assembly is removed from the nest. The unfused mold assembly is then passed to the one or more wedge shaped elements to cause the mold assembly to be physically opened and the mold sections separated from one another, thereby revealing the lens shaped article. In accordance with the invention, the lens shaped article is typically adhered to the mold section having a concave lens shaped surface, such mold section hereinafter sometimes referred to as a "mold cup." In another aspect of the invention, apparatus and methods are provided for removing a lens shaped lens shaped article from a mold section, for example, a mold cup, of a separated mold assembly. For example, the method may comprise the step of, after the separating step, immersing, for example, soaking, the predetermined mold section and lens shaped article adhered thereto, in a soaking liquid in order to facilitate release of the lens shaped article from the predetermined mold section. This step may also be performed in a manner that will effect or initiate hydration and swelling of the lens shaped article, thereby facilitating its release from the mold section.

Preferably the soaking liquid is at a temperature of up to, but preferably not exceeding about 100° C. In some embodiments of the invention, the method may also comprise transmitting ultrasonic energy through the soaking liquid during the soaking step.

In another broad aspect of the invention, apparatus and methods are provided for easily, effectively and safely removing contact lens products from molding cups, and for placing the removed lens products in a carrier for holding the products during further processing steps, such as extraction and hydration.

Advantageously, the present methods and apparatus employ a vacuum assembly that reduces risk of damage to the lens products during removal from the molding cups relative to conventional devices used for this purpose.

The methods generally comprise placing a form or body containing a plurality of apertures or "through holes" in proximity a contact lens carried by a molding cup, and applying a reduced pressure through the plurality of through holes to the contact lens sufficient to cause the contact lens to separate be drawn toward the form and to separate from the molding cup.

In an additional aspect of the invention, a form or body is provided wherein the form or body includes at least one channel extending only partially through the form, and at least one through hole in fluid communication with the at least one channel. The form or body is placed in proximity to a contact lens carried by a molding cup, and a reduced pressure, or partial vacuum, is applied through the at least one through hole to the contact lens. The reduced pressure is sufficient to cause the contact lens to be drawn toward the form and to become separated from the molding cup.

The present methods advantageously further comprise separating the form and the contact lens from the molding cup and thereafter separating the contact lens from the form.

In a further broad aspect of the present invention, removing apparatus for removing contact lenses from molding cups are provided. Such removing apparatus comprise a vacuum assembly including a form or body at least partially defining a hollow space. The body has a head surface sized and adapted to at least somewhat conform to a major surface of a contact lens product. More specifically, the head surface is shaped to substantially conform to at least a portion of an outward-facing surface of the contact lens carried by the molding cup. Advantageously, the head surface is shaped to substantially conform to at least a major portion, that is at least about 50% or more than 50%, of the outward-facing surface of the contact lens product carried by the molding cup. The outward-facing surface of the contact lens product carried by the molding cup may be concave or convex. In a preferred embodiment of the invention, the contact lens product is carried by the "female" mold section. Accordingly, the outward-facing surface of the lens product in the mold section is concave. In this instance, the head surface of the form or body is preferable correspondingly convex in shape.

One or more through holes extend from the head surface to the hollow space in the form. By applying a vacuum or reduced pressure to the hollow space, a contact lens product in proximity to the head surface is drawn toward and into contact with the head surface.

Preferably, the body has at least 3 through holes, for example, in the range of about 3 to about 10, or about 15 or more, through holes. In one embodiment, the form has more than 3 through holes.

The contact lens carried by the molding cup, may advantageously be a hydrophilic contact lens product, for example, a hydrogel polymeric contact lens product, often a lens product that is at least partially hydrated.

The form or body of the vacuum assembly preferably comprises a material that is easy to machine and suitable for working in an environment of deionized water and/or saline solution which are commonly present during the relevant stages of the manufacture of contact lenses. The form may be made of a polymeric component, for example, one or more acetyl copolymers, other suitable polymers and/or copolymers, for example, polyethylene, polypropylene, polytetrafluoroethylene, polyetheretherketone and the like and mixtures thereof. Alternatively, a metallic construction could be employed, for example, stainless steel, Hastelloy®, and/or other corrosion-resistant alloys.

In some embodiments, the present methods are conducted employing a system other than a constant vacuum system, for example, a motorized vacuum system which produces a constant level of vacuum. Accordingly, in accordance with the invention, the applying step may be conducted using a system other than a motorized vacuum pump. In a very useful embodiment, the applying step is conducted employing positive displacement of a piston-like device located in fluid communication with a hollow space at least partially defined by the form or body. Very useful results are achieved where the piston-like device is a syringe.

The applying step is preferably initiated after the step of placing the form in proximity to the contact lens product held in the mold section.

In one very useful embodiment, the present removing apparatus further comprise a vacuum system operatively coupled to the form or body. The vacuum system may be manually operable. For example, the vacuum system may be in the form of a syringe, for example a manually operated syringe.

In another aspect of the invention, means are provided for releasing the contact lens product from the form and placing the contact lens product in a holding tray. For example, after the product has been removed from the molding cup, the product is transferred to a carrier tray. For example, the vacuum may be continually applied to the product such that the product adheres to the form while the form is positioned over the carrier tray. The vacuum is then released, allowing the product to fall into the tray.

In one feature of the invention, the vacuum assembly includes means for maintaining the lens product in a desired position while the lens product is being released from the vacuum form. For example, the invention may include providing an air shroud around the lens product when the lens product is being released from the vacuum form. The air shroud comprises a cylinder of air that is directed about the perimeter of the vacuum form. This feature of the invention maintains the lens product in a desired position, for example, substantially prevents the lens product form folding, twisting or the like during release thereof from the vacuum form.

In another broad aspect of the invention, holding apparatus for facilitating processing of contact lens products, for example contact lenses recently removed from mold cups, are provided. The present holding apparatus may be used, for example, to hold a large number of newly formed contact lenses, in order to facilitate effective fluid processing of such lenses. In addition, the present holding apparatus may be such as to facilitate proper identification of the contact lenses being held/carried. Such lens identification benefits of the present invention may reduce lens manufacturing costs and facilitate the desired, e.g., individually prescribed, contact lens being provided to each lens wearer.

In a more specific aspect of the present invention, holding apparatus for processing contact lenses with fluids are provided. The holding apparatus comprises a plurality of trays, with each tray being structured to hold a plurality of recently formed contact lenses. Each tray comprises a plurality of spaced-apart cell walls and a plurality of spaced-apart cover walls. Each cell wall is sized and adapted to at least partially define a space or cell to carry a contact lens to be processed. Each cell wall is structured to allow processing fluid to pass through the space or cell to contact the contact lens located therein. Each cover wall is sized and adapted to cover a cell wall of another tray coupled to the tray and thereby to confine a contact lens carried in a space or cell at least partially defined by a cell wall of another tray in such space or cell. Each cover wall is structured to allow processing fluid to pass through a space or cell at least partially defined by a cell wall of another tray to contact the contact lens located therein when the tray is coupled to another tray.

In one embodiment, each of the cell walls and each of the cover walls include at least one through hole, for example, the at least one through hole extends between the cell wall and the cover wall, respectively. In a particularly useful embodiment, each of the cell walls and each of the cover walls include a plurality of through holes. At least one through hole or plurality of through holes are very effective in providing for the processing fluid to have access and flow through the space or cell at least partially defined by a cell wall to contact the lens located therein. Such access is highly advantageous to provide for mass transfer, for example, mass transfer of extraction fluids, between the lens within such space or cell and the fluid passing through such space or cell.

In one embodiment, the plurality of through holes extend between the cell wall and the cover wall. For example, the plurality of through holes within the cell wall are substantially aligned with the plurality of through holes within the over wall.

In one useful embodiment, each of the trays is structured to be coupled to another one of the trays. For example, in one embodiment, the holding apparatus comprises two of the trays coupled together to form a tray set effective for carrying a plurality of contact lenses to be processed. In this arrangement, each individual carried contact lens is located in an individual cell, for example, a different cell, for example, between one cell wall of one of the trays and one cover wall of the other of the trays.

More specifically, each of the present trays preferably is stackable with another of the trays. For example, two trays can be stacked together to form a tray set. In a very useful embodiment, all of the trays are substantially identically structured.

In one embodiment, each of the cell walls is generally concave and each of the covered walls is generally convex. However, the opposite arrangement may also be employed. That is, each of the cell walls may be generally convex and each of the cover walls may be generally concave. Each of the cell walls may be located in a substantially opposing position relative to a different one of the cover walls. In this embodiment, each of the trays may include a series of partitions with each partition including one cell wall and one cover wall.

The number of cell walls and cover walls included in each of the trays may vary over a wide range. Often, the cell walls and cover walls are arranged in a specific pattern, for example a rectangular array, a square array, and other geometric configuration array. In one embodiment, each of the trays includes about 20 to about 100 cell walls and about 20 to about 100 cover walls. Preferably, each of the trays includes about 25 to about 65 cell walls and about 25 to about 65 cover walls.

The cells of the trays, that is the spaces defined between individual cell walls of one tray and individual cover walls of another tray when the two trays are coupled together, are advantageously designed so that lens movement within each cell is restricted during processing to prevent the lenses in the cells from folding and/or becoming damaged.

The tray design preferably includes features that minimize the transfer of processing fluid from one processing stage to another, and also enable machine handling of trays between processing stages.

The trays are manufactured so as to be substantially unaffected by the conditions and materials used to process the contact lenses being carried in the cells of the trays. Advantageously, the trays are substantially resistant to alcohols, for example, alcohols such as methanol, ethanol, propanol, and the like and mixtures thereof. In one very useful embodiment, the trays are substantially resistant to ethanol.

Very useful results are obtained when each of the trays comprises a polymeric material, for example, polypropylene homopolymer and the like polymeric materials, that is both suitable for use in an alcohol, e.g., ethanol-containing environment and has a low attenuation of ultrasonic energy which may be used during the fluid processing of the contact lenses to facilitate agitation of the fluids used in such processing. Such agitation or movement of the fluid facilitates mass transfer between the lenses and the processing fluids.

In one embodiment, the plurality of trays includes a plurality of different series of trays, with each series of trays being distinguishable from the other series of trays. Such distinction may be employed to facilitate identifying different contact lenses being carried in each series of trays.

In one embodiment, the distinctions between the different series of trays are visually identifiable. For example, the plurality of trays may include two or more different series of trays with each individual series of trays having a different color from each other series of trays. Alternatively or additionally, the distinction between the different series of trays may be mechanical distinctions or structural distinctions. For example, each series of trays may have one or more of a differently shaped notch, for example, a peripheral notch, one or more extra, e.g., raised, portions, one or more extra holes or indents, and the like mechanical/structural distinctions, and combinations of such distinctions. The distinctions may be at least one of visually identifiable, tactilely identifiable and mechanically/structurally identifiable, for example by means of a laser scanning mechanism. Also, each single tray or tray set may have one or more visually or tactilely identifiable distinctions and/or one or more mechanical/structural distinctions.

In one embodiment, a plurality of tray sets is located in a tray set carrier, which may also be included as part of the present holding apparatus. In one embodiment, the present invention involves a plurality of tray sets, a tray set carrier, and a plurality of carried contact lenses with each carried contact lens being located in a cell between one cell wall of one of the trays and one cover wall of the other of the trays of a tray set. The tray set carrier, preferably with the tray sets and contact lenses, is structured to be portable. For example, such tray set carrier is sized and adapted to be manually or automatically moved from place to place, for example, from one contact lens processing step or stage to another.

Any and all features described herein and combinations of such features are included within the scope of the present invention provided that the features of any such combination are not mutually inconsistent.

These and other aspects and advantages of the present invention are apparent in the following detailed description and claims, particularly when considered in conjunction with the accompanying drawings in which like parts bear like reference numerals.

DETAILED DESCRIPTION OF THE INVENTION

The ophthalmic lenses to be demolded in the practice of the present invention are preferably contact lenses, molded between contact lens mold sections which are themselves molded articles.

Figure 1:
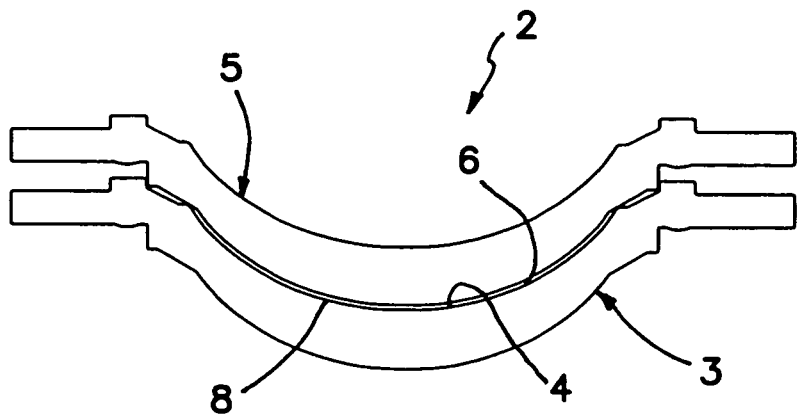
FIG. 1 is a cross sectional view of a contact lens mold assembly that can be demolded using the methods of the present invention, the mold assembly generally including a first mold section having a generally concave lens shaped surface, a second mold section having a generally convex lens shaped surface, and a polymerized, lens shaped article disposed between the concave and the convex lens shaped surfaces.

In a broad aspect of the present invention, methods of demolding ophthalmic lenses, for example soft, extended wear silicone hydrogel lenses, are provided. In a preferred embodiment of the invention, the method generally comprise providing a mold assembly 2, such as the mold assembly 2 shown in cross sectional view in FIG. 1. The mold assembly 2 generally includes a first mold section 3 having a first lens defining surface 4, for example, a generally concave lens shaped surface, and a second mold section 5 having a second lens defining surface 6, for example, a generally convex lens shaped surface. The mold assembly 2 further comprises a polymerized lens shaped article 8 disposed between the first lens defining surface 4 and the second lens defining surface 6, that requires removal from the mold sections 3 and 5 for final processing steps and packaging.

For the sake of simplicity and illustrative clarity, the following detailed description will be directed primarily to the demolding of molded silicon-containing hydrogel contact lenses for example, those lenses formed from a polymerizable composition comprising a formulation based on a polysiloxanyl dimethacrylate silicone monomer, or a combination of polysiloxanyl dimethacrylate silicone monomer and a polydimethylsiloxane methacrylate derivative. The specific features and demolding conditions, described in specific detail herein and not to be considered limiting to the scope of the present invention, are those discovered to be favorable to the manufacture of silicone hydrogel lenses. The lens shaped article in the mold assembly may be a silicone containing hydrogel ophthalmic lens that has been manufactured using radiation initiated polymerization of a monomer composition, the radiation polymerization being in the form of ultraviolet light, for example.

A preferred polymerizable composition for the manufacture of silicone hydrogel lenses that is suitable for use with the systems, apparatus and methods of various aspects of the present invention is described in U.S. Application No. 60/604,961, filed Aug. 27, 2004 and U.S. Application No. 60/621,525, filed Oct. 22, 2004, which are hereby incorporated by reference in their entireties. The polymerizable composition may include components such as a tint component, a UV blocker component, and/or the like.

It will be appreciated by persons of ordinary skill in the art that the methods and systems in accordance with the invention, possibly with appropriate modifications thereto, can be utilized in the demolding of other types of molded lenses formed from other polymerizable composition formulations, and all such modified methods and systems are considered to be within the scope of the present invention.

Preferably, the mold assembly 2 in some embodiments of the invention comprises a molded plastic material that is at least partially transparent to the ultraviolet light. For example, the mold sections 3 and 5 in accordance with the present invention may comprise an ethylene vinyl alcohol resin (hereinafter, usually, EVOH).

Figure 2:
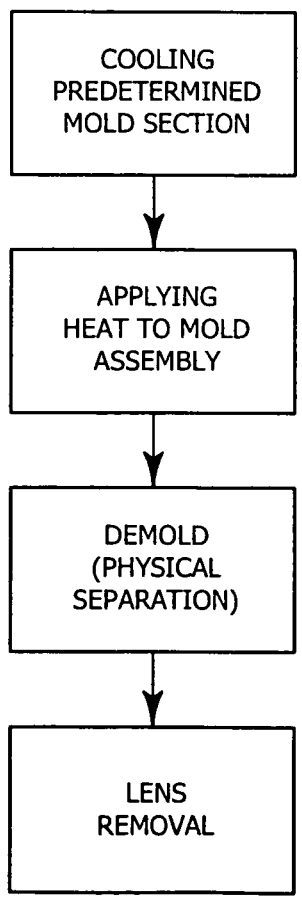
FIG. 2 shows a flow chart of a method for separating sections of an assembled mold assembly, in accordance with the present invention.

Turning now to FIG. 2, a flow chart is provided to illustrate demolding steps in accordance with an embodiment of the invention. The demolding methods in accordance with the present invention are directed primarily at the steps involved in demolding the mold assembly to the point of exposing the lens shaped article on a predetermined one of the mold sections in order to facilitate later processing steps.

The demolding methods of the present invention may be performed in a demolding processing station of a contact lens manufacturing facility. The methods are directed at a stage in the manufacturing process sometimes referred to as the peel stage, that involves separating or prying apart the first mold section from the second mold section so as to physically expose a polymerized contact lens shaped article situated in one of the mold sections. After the demolding stage, the exposed lens shaped article, retained on one of the mold sections is conveyed to station structured for removing the lens shaped article from the mold section and to an extraction/hydration station (not shown) located downstream of the demolding processing station.

Preferably, the demolding process in accordance with the present invention occurs under carefully controlled conditions, as will be explained in detail below, so that the first mold section 3 will be separated from the second mold section 5 without harming the integrity of the lens shaped article 8 formed in the mold assembly 2.

In one aspect of the invention, the methods of the invention include steps directed at preparing the predetermined mold section, for example, the first mold section, to facilitate retention of the lens shaped article by the first mold section and to enable efficient removal of the second mold section therefrom. More specifically, in order to prepare the predetermined mold section the method includes cooling the predetermined mold section, for example, by applying a cooling agent to at least a portion of an outer surface thereof. It is to be appreciated that the cooling step is often an optional step and may not be included in many embodiments of the present-invention.

After the optional cooling step, the demolding process in accordance with the invention comprises placing the mold assembly in a fluid, for example, a liquid at an elevated temperature, to facilitate defusing of bonded regions between the mold sections. In some embodiments, the step of placing the mold assembly in a fluid comprises applying heat to the mold assembly, for example, immersing the mold assembly, at least partially, in a liquid bath of deionized water at a temperature not exceeding 100° C.

The method further comprises steps directed at physically separating, for example, splitting apart the predetermined mold section from the other one of the mold sections in order to expose the lens shaped article retained on the lens shaped surface of the predetermined mold section. The lens shaped article may thereafter be removed from the predetermined mold section using suitable techniques known in the art, and the lens shaped article subjected to extraction and hydration steps as desired.

By "predetermined mold section" is meant the one mold section that is selected from the first mold section and the second mold section, to be the mold section that retains the contact lens shaped article upon the separation of the first mold section and the second mold section. In a preferred embodiment of the invention, the predetermined mold section is the first mold section 3, which is often hereinafter referred to as the "mold cup" in that the first mold section is the female mold section having the concave lens shaped surface 4.

In high volume, highly automated contact lens manufacturing facilities employing the methods of the present invention, it is desirable that the all of the contact lens mold assemblies are demolded in a manner that will result in a high probability that the contact lens shaped article will reliably adhere to, or be retained by, only one of either the first mold section or the second mold section. For purposes of the present description, though not to be considered limiting the scope of the present invention, the first mold section is typically the front mold section, sometimes referred to as the female mold section or mold cup, and the second mold section is typically the back mold section, sometimes referred to as the male mold section.

In a more specific aspect of the invention, the step of cooling includes cooling the predetermined mold section to cause the lens to be retained by the cooled mold section upon separation of the mold sections. In this embodiment, the step of cooling includes applying an agent, for example a cooling agent, to at least a portion of the predetermined mold section. The application of the cooling agent assists in drawing heat from the predetermined mold section. The cooling agent may comprise any suitable agent that can be readily applied to one of the mold sections to cool or freeze the mold section, in some instances, without causing any significant cooling of the other one of the mold sections. For example, the cooling agent may comprise liquid nitrogen that is applied to an outer surface of the predetermined mold section by suitable means, for example, but not limited to dipping, or in the form of droplets, for example, a spray.

Alternatively, the mold section may be cooled by applying one or more of the following to the mold section: carbon dioxide, diflouroethane, or other refrigerant, cooled air or other gas, cool liquids or solvents, in the form of sprays, droplets, or other suitable means of applications, including but not limited to dipping one or both of the mold sections into the agent.

Preferably, the step of cooling comprises cooling the predetermined mold section to achieve a temperature of the mold section of between about 0° C. to about −200° C.

In other embodiments of the invention, it is not the predetermined mold section that is cooled in the cooling step. For example, in other embodiments of the invention, the step of cooling comprise cooling the mold first mold section, the second mold section or both mold sections depending, at least in part, on the type of material of which the lenses and/or mold sections are made.

For example, a person of ordinary skill in the art, using routine experimentation techniques can determine which one of the mold sections, or whether both of the mold sections, are to be cooled to achieve the desired result based on the type of material of which the lenses or mold sections are made. The knowledge gained by such experimentation, regarding which mold section will most often or always retain the lens upon cooling or freezing of a known mold section can be used to facilitate rapid automatic processing of the lenses after the decoupling process.

For example, in one aspect of the invention, the method comprises determining which of the mold sections will tend to reliably and most often retain the lens product when a specific one, or both of the mold assemblies are cooled, for example to a desired temperature. The step of determining may include providing a plurality of identical mold assemblies containing identical lens products, and cooling a specific one of either the first mold section and the second mold section of all of the mold assemblies, and thereafter separating the mold sections to determine which of the mold sections of the mold assemblies most often retains the lens after the separation. Once this determination is made, the predetermined mold section will be known for purposes of facilitating demolding of a relatively larger number of these specific types of mold assemblies, for example using high speed, and/or automated demolding processes and/or equipment.

For example, some embodiments of the invention may include cooling the first mold section in order to cause the lens shaped article to be retained by the second mold section. In yet another embodiment of the invention, the method comprises cooling both the first mold section and the second mold section in order to cause a predetermined one of the first mold section and the second mold section to retain the lens shaped article when the first and second mold sections are separated. All of these variations of demolding techniques involving cooling or freezing one or both mold sections in order to facilitate or cause retention of the lens product on a predetermined one of the mold sections are considered to be within the scope of the invention.

After the cooling step, the mold assembly is moved to a location where the mold assembly is contacted with a liquid to facilitate separation of the first mold section and the second mold section. Typically, in accordance with the present invention, the contacting step involves placing the mold assembly in a fluid, for example immersing the mold assembly in a liquid, for example an aqueous liquid, for example, deionized water. More specifically, the step of contacting may include heating the mold assembly, using a liquid at an elevated temperature, to facilitate decoupling of the first mold section from the second mold section.

Typically, in accordance with one embodiment of the invention, the heating step includes placing the cooled mold assembly in a relatively warm or heated fluid for a period of time effective to reduce adhesion between the lens shaped article and the lens shaped surface of the other mold section, i.e. the mold section that is not the predetermined mold section. The mold assembly is left to remain in the fluid for about 1 second to about 10 seconds, for example, about 7 seconds.

The effectiveness of the heating step in separating the mold sections may be enhanced by immersing the mold assembly in the liquid, for example the deionized water, while ultrasonic energy is transmitted through the liquid. Therefore, in one aspect of the invention, the method includes transmitting ultrasonic energy through the liquid while the mold assembly is immersed therein, in order to reduce the amount of time the mold assembly must remain in the liquid for the step of heating to be effective. The ultrasonic energy causes cavitation of the fluid, for example, the formation of microbubbles that assist the decoupling.

The ultrasonic energy is at a frequency effective to enhance separation of the first mold assembly from the second mold assembly, for example, the ultrasonic energy may be applied at about 38 KHz.

Preferably, the liquid is at a temperature of up to, but preferably not exceeding about 100° C. For example, the liquid may have a temperature of between about 20° C. and about 95° C.

Alternatively, the step of heating the mold assembly may comprise applying hot steam to the mold assembly, or other means of heating the mold assembly to accomplish the objective of facilitating decoupling of the mold sections.

After the step of heating the mold assembly, the method of the invention may further include steps directed at splitting apart or physically separating the first mold section from the section mold section. While the heating step facilitates decoupling of the first mold section from the second mold section, it should be understood that in most instances, the mold sections must also be subjected to a process directed at causing physical splitting apart, for example, peeling away, of the mold sections from each other. In accordance with the present invention, the steps of physically separating are directed at removing the other of the mold sections, for example, the second mold section, from the lens shaped article while the lens shaped article remains retained by the predetermined mold section, for example, the first mold section.

Referring now in particular to the step of physically separating the mold section, the mold assembly after having been cooled and subsequently heated as described hereinabove, is placed in a mold separation apparatus structured to mechanically pry the mold section not retaining the lens. In this example, the second mold section, from the predetermined mold section to physically expose the lens shaped article retained thereby. The mold separation apparatus may include a device having a cutting element and/or prying element.

In accordance with one aspect of the invention, the mold assembly is positioned between two cutting/prying elements, for example two wedge shaped elements having tapered edges. The tapered edges of the wedge shaped elements are wedged between interfacing peripheral portions of the first mold section and the second mold section. The mold assembly is split by moving the mold assembly along the wedge shaped elements, from the thin edge to the thick edge of the wedge shaped elements, which causes the mold sections to be pried apart and separated.

Other means for decoupling the mold sections may alternatively or additionally be utilized in this step. For example, rather than utilizing linear wedge shaped elements to pry the mold sections apart, it is contemplated that a revolving element, for example, a spiral shaped element may be employed for engaging edges of the mold assembly and opening the assembly upon engaging and revolving around the circumference of the mold assembly. Other alternative means of decoupling the mold sections include, but are not limited to the use of lasers, infrared light and soaking of the mold assembly in acetic acid.

The lens shaped article is now physically exposed and remains adhered to or retained on the lens shaped surface of the predetermined mold section until further processing steps can be performed thereon. The other one of the mold sections is generally discarded.

In order to cause or facilitate release of the now exposed lens shaped article from the predetermined mold section lens shaped surface, the method may further comprise soaking the mold section and exposed lens shaped article adhered thereto in a soaking liquid while the soaking liquid is continually circulated and filtered. This step may also be performed in a manner that will cause a desired hydration of the lens shaped article. Preferably the soaking liquid is deionized water at a temperature not higher than about 100° C. For example, the soaking liquid may comprise deionized water at a temperature of about 75° C. The method may also comprise transmitting ultrasonic energy through the soaking liquid during the soaking step. Extraction and hydration of the lens shaped article may occur in conjunction with the soaking step.

Figure 3:
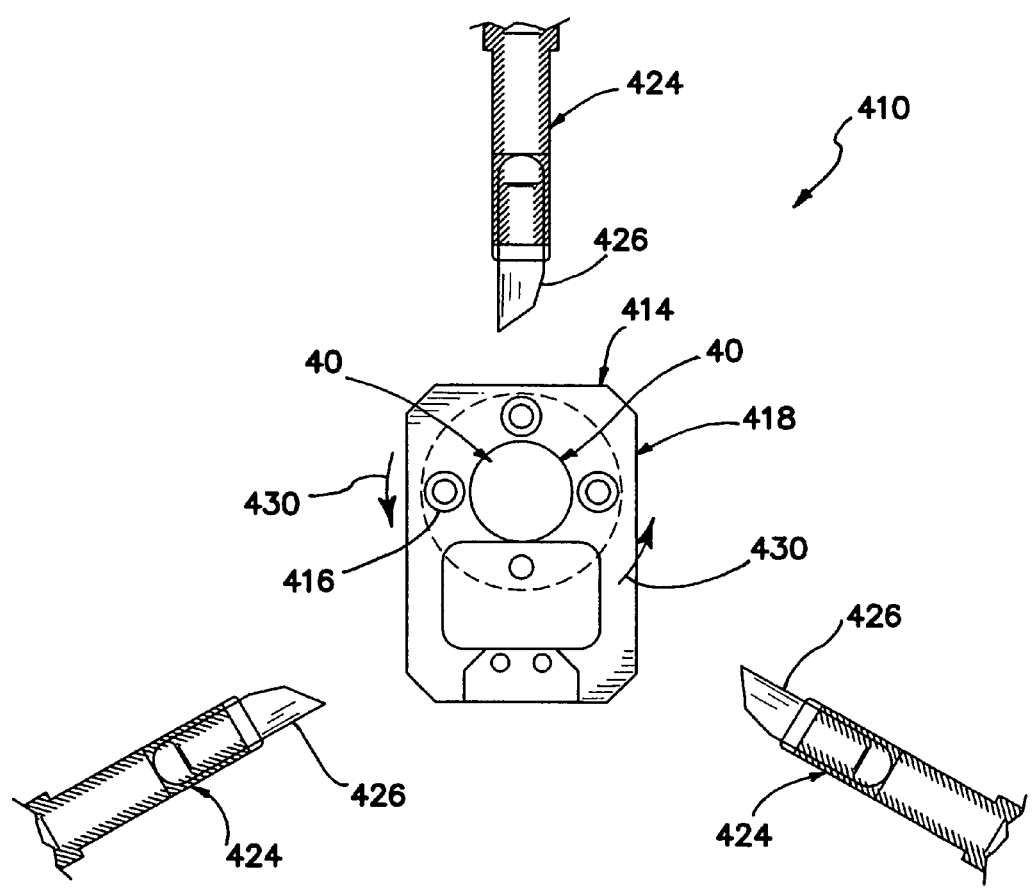
FIG. 3 is a top view of a decoupling assembly in accordance with yet another aspect of the present invention.
Figure 4:
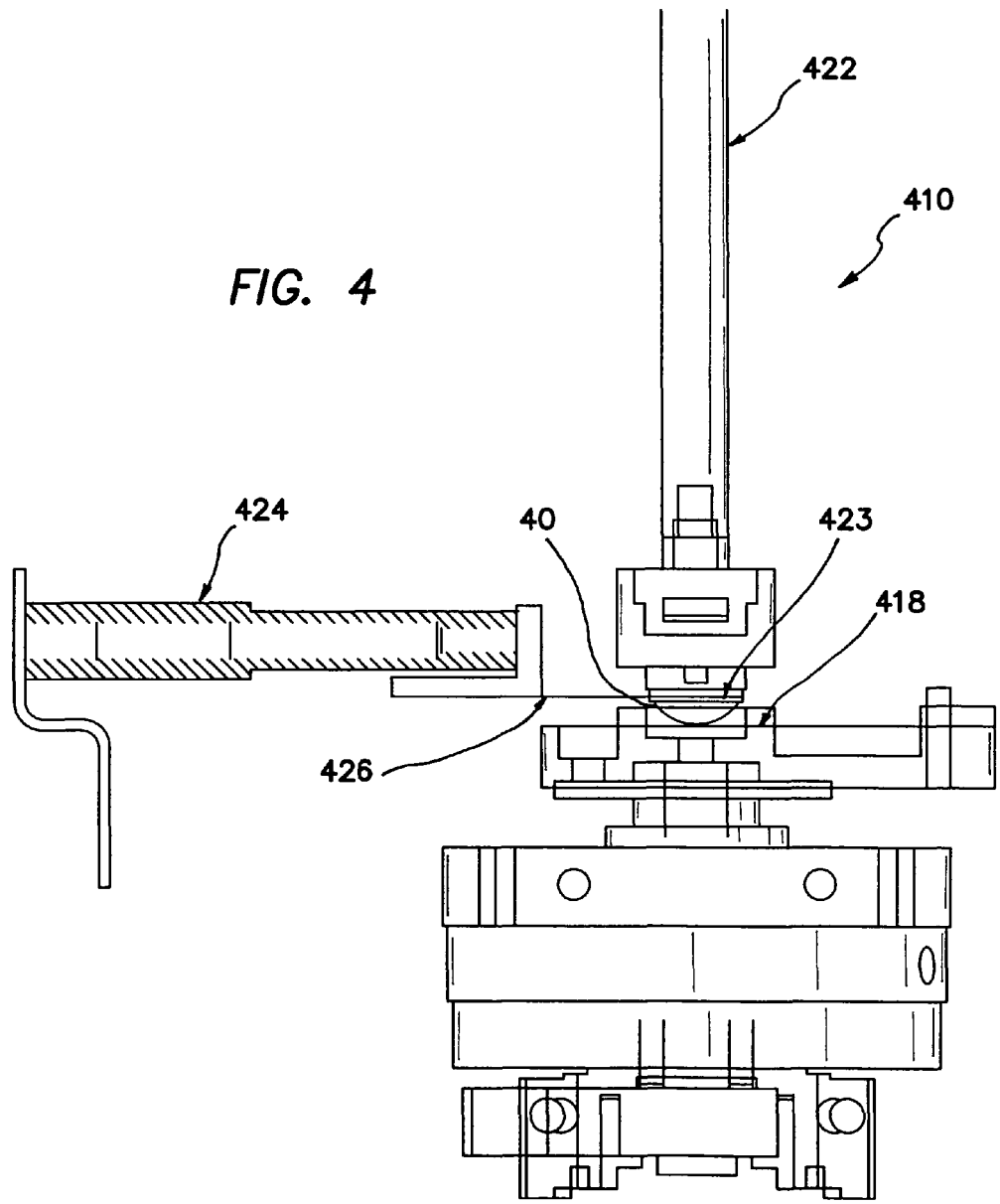
FIG. 4 is a side view of the decoupling assembly shown in FIG. 3.

Turning now to FIGS. 3 and 4, optional methods and apparatus are provided for defusing fused regions between mold sections of mold assemblies, for example, to facilitate the decoupling and separating processes described hereinabove.

For example, the present invention provides a defusing assembly 410 useful for unfusing, or cutting through, fused portions of the assembled mold sections in order to facilitate the decoupling process. Preferably, the defusing process is at least partially automated. The assembly 410 may include means for securing the fused molding assembly in a fixed position, means for inserting one or more blades into the fixed molding assembly, and means for rotating the molding assembly so as to cause the one or more blades to cut through the welded regions of the molding assembly and cause separation of the mold sections.

For example, in accordance with some embodiments of the present invention, the molding assembly 40 is placed into a holder or nest 414 of the decoupling assembly 410 which is structured to hold the molding assembly 40 securely in a laterally fixed position on a nest platform 418. The defusing assembly 410 may further include structure for securing the molding assembly 40 in a longitudinally fixed position. For example, the decoupling assembly 410 may comprise a downwardly extending arm 422 (FIG. 11) which can be automatically or manually moved toward the nest 414 and the molding assembly 40. The downwardly extending arm 422 may include a mechanism 423 that contacts the molding assembly 40 and secures the molding assembly 40 in a longitudinally fixed position between the nest platform 418 and the downwardly extending arm 422. Once the molding assembly 40 is properly secured, it is substantially fixed in position, and is non-rotatable with respect to the nest 416 and downwardly extending arm 422.

The defusing assembly 410 further includes one or more inwardly extending cutting assemblies 424 which may automatically be moved toward the nest 416 and the molding assembly 40 fixed thereto. Each of the inwardly extending cutting assemblies 424 includes a cutting element 426, for example, a blade, for example, a heated blade 426, on a distal end thereof. Upon moving inwardly, the inwardly extending cutting mechanism engages the fixed molding assembly 40 and is inserted between the flange regions of the mold sections. In the particular decoupling assembly 410 shown, three blades 426 are automatically inserted into the molding assembly 40, generally between the mold sections thereof.

Figure 10:
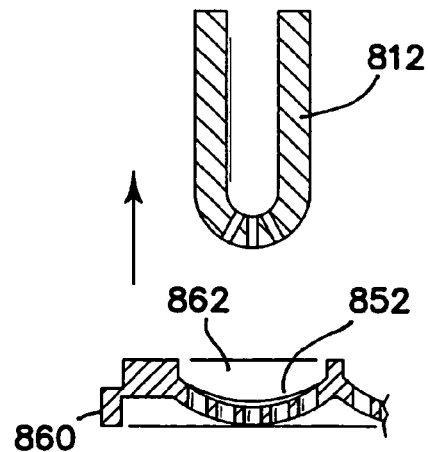
FIG. 10 is a cross-sectional view of the vacuum body similar to the view shown in FIG. 9, the vacuum body now shown being withdrawn from the contact lens processing tray after the contact lens has been released from the vacuum body and placed into the processing tray.

The defusing assembly 410 further includes structure effective to rotate the nest 416 and mold assembly 40 therein, for example in the direction represented by arrows 430 in FIG. 10. In this instance, the assembly rotates anti-clockwise towards the bottom right cutting element. It should be appreciated that nest 416 can rotate clockwise or anti-clockwise, depending upon which direction the sharp face of the blade is facing. The rotation causes the cutting element inserted therein to slice apart the mold sections at the fused regions. The means for rotating may comprise an actuator adapted and structured to rotate the clamped molding assembly in an appropriate direction such that the rotating motion causes the hot blades 426 to cut through the ultrasonically welded joins between the mold sections. The cutting elements 426 may then be automatically retracted and the molding assembly removed from the nest 416.

Figure 4A:
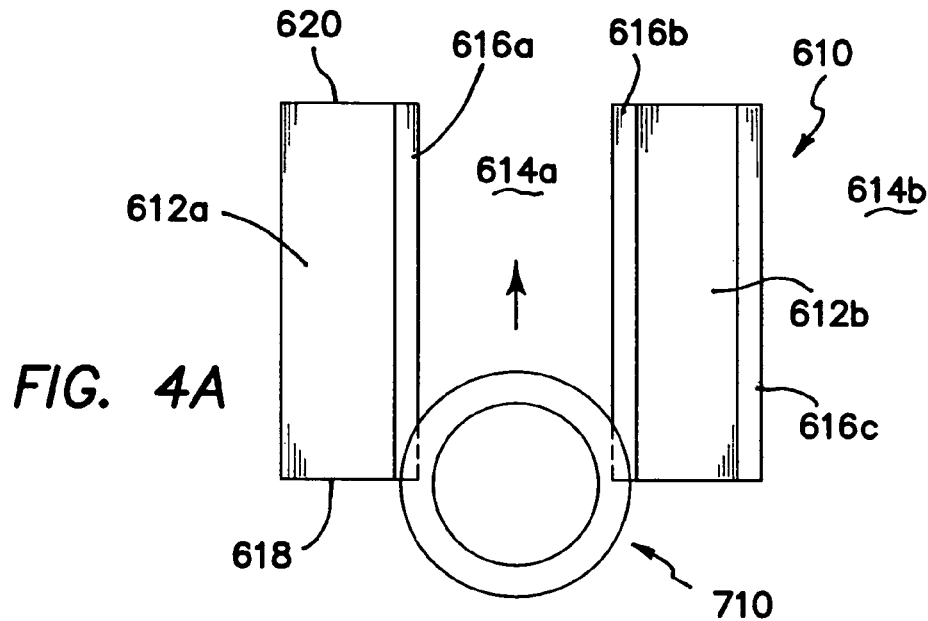
FIG. 4A is a top plan view of a mold assembly being separated by a separation device of the present invention.
Figure 4B:
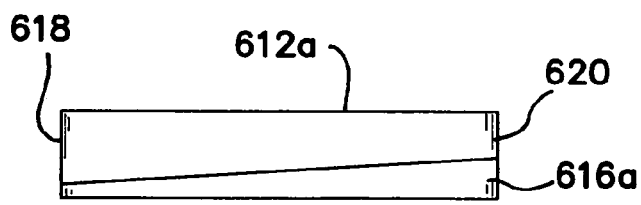
FIG. 4B is a side plan view of one of the separators of FIG. 4A.

Turning now to FIG. 4A and FIG. 4B, after the lens precursor composition is polymerized and, optionally, the defusing step, are performed, methods of the invention may further comprise a step of separating the second mold section and the first mold section. In certain embodiments, the separating comprises placing a wedge or other separation device 610, as shown in FIG. 4A, between the first mold section and the second mold section. This may be accomplished by moving a wedge relative to a fixed mold section, or may be accomplished by moving the mold assembly relative to a fixed wedge. In embodiments in which the wedge is linear, the movement is usually linear from a thin region of the wedge to a thicker region of the wedge. In embodiments in which the wedge is circular, such as a disk, the movement may be circular so that the wedge or the assembly rotates about a central axis and causes the first and second mold sections to separate. In certain embodiments, the wedge is unheated. However, in other embodiments, the wedge may be heated to facilitate separation of the mold sections. Alternatively, the wedge may be cooled. Additional embodiments may employ a laser cutting knife to separate the mold sections.

As shown in FIG. 4A, a mold assembly separation device in accordance with an aspect of the invention is illustrated at 610. The device 610 comprises a first separator 612*a* and a second separator 612*b*. The first separator 612*a* and the second separator 612*b* are spaced apart to form a mold assembly track 614*a*. The mold assembly 710 can be moved along the track 614*a* in the direction of the arrow to separate the two mold sections of the mold assembly. The first separator 612*a* comprises a wedge 616*a*. Similarly, the second separator 612*b* comprises a wedge 616*b*. In addition, the second separator 612*b* comprises a second wedge 616*c*, and can be used to form a side of a second track 614*b* with a third separator (not shown).

As shown in the side view of FIG. 4B, the first wedge 616*a* is tapered along the length of the separator 612*a*. For example, the wedge 616*a* has a small thickness, such as a knife edge, at the first end 618 of the separator 612*a*, and a relatively greater thickness at the second end 620 of the separator 612*a*. The wedge progressively increases in thickness along the length of the separator. In certain embodiments, the thickness may remain constant (i.e., not tapered) at a portion of the separator near the second end 1520. Wedges 616*b* and 616*c* are substantially identical in structure to wedge 616*a*.

To separate the mold sections of the mold assembly 710, the mold assembly 710 contacts the wedges 616*a* and 616*b* between the two mold sections of the mold assembly. The mold assembly 710 moves relative to the wedges 616*a* and 616*b* until the second mold section is separated from the first mold section due to the stress caused by the progressively increasing thickness of the wedges. Alternatively, the separators could be moved relative to the mold assembly if desired.

In accordance with another aspect of the invention, the present invention further provides methods, systems and components of such systems for removing contact lenses from molds and processing such contact lenses, for example, recently molded contact lenses.

The present methods, systems and apparatus are very useful in removing swellable polymeric contact lenses, for example, contact lenses comprising hydrophilic polymeric materials, from mold sections or molding cups, and holding such removed lenses during further processing steps. Such contact lenses are often described as being swellable contact lenses in that during use of such contact lenses the lenses include sufficient amounts of water to be swelled by such water. For example, such contact lenses often include about 10% or about 15% or about 20% to about 50% or about 60% or about 80% by weight of water in an equilibrium state, for example, when being worn on an eye. Such contact lenses are often referred to as soft hydrophilic contact lenses or hydrogel contact lenses. In one particularly useful embodiment, the contact lenses include hydrophilic silicon-containing polymeric materials. The contact lenses are often produced using hydrophilic monomeric materials, that is hydrophilic monomers, for example, together with one or more other monomers, which are polymerized in forming the contact lenses.

The present invention is very useful during the later stages of contact lens manufacturing. For example, the present invention is useful in processing contact lenses which have been recently formed, for example, by polymerization of one or more monomers. Such recently formed contact lenses often include amounts of extractable materials, such as one or more monomeric components which have failed to react or failed to react completely during the polymerization processing, and/or other extractable materials present in such lenses. In order to provide contact lenses suitable for safe and effective wear in the eyes of humans or animals, such recently formed contact lenses advantageously are treated to remove such extractable materials.

In one aspect of the present invention, apparatus and methods are provided for removing such contact lenses, for example, recently formed contact lenses, from molding cups. The removed lenses may be processed in any suitable manner for example, extraction processing to remove extractable material from the lenses, hydration processing and packaging, to provide the final contact lens product for safe and effective wear. However, in order for such post-molding processing to occur effectively, the lenses need to be removed from the molding cups. The present invention provides apparatus (hereinafter usually "removing apparatus") effective to remove or facilitate removal of contact lenses from molding cups, for example, in an effective and efficient manner and with reduced risk of damaging or otherwise harming the lenses.

In another aspect of the invention, apparatus are provided for processing such recently formed lenses that have been removed from mold cups. The present invention further provides apparatus, (hereinafter usually "holding apparatus") effective to hold recently formed contact lenses during processing steps such as extraction and hydration, for example, during processing using fluids, for example, liquids, to remove extractable materials from contact lenses and provide contact lenses which are safe and effective in use.

Figure 5:
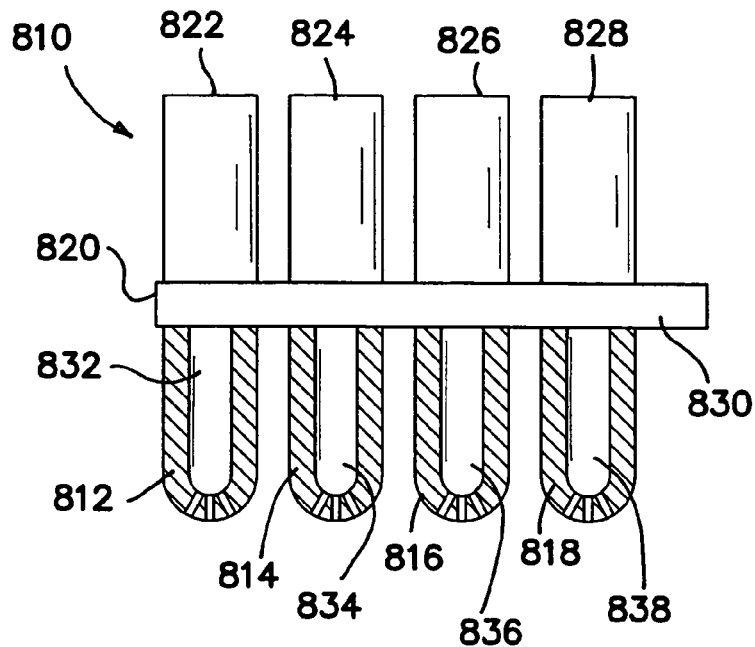
FIG. 5 is a somewhat schematic illustration of one embodiment of a removing apparatus of the present invention, the removing apparatus including a plurality of vacuum generators.

With reference to FIG. 5, a removing apparatus, shown as 810, in accordance with one aspect of the present invention, includes a series of four (4) vacuum bodies 812, 814, 816 and 818. Each of these vacuum bodies 812, 814, 816 and 818 is joined, through a vacuum manifold 820, to individual vacuum generators 822, 824, 826 and 828, respectively. The manifold 820 provides fluid communication between each of the vacuum bodies 812, 814, 816 and 818 and each of the vacuum generators 822, 824, 826 and 828, respectively. In addition, the manifold 820 includes a laterally extending portion 830 which is effective to provide attachment to a robot or other operating/controlling mechanism during use of the removing apparatus 810.

Thus, in the embodiment shown, removing apparatus 810 is usable in conjunction with a robot, for example, a robot of conventional design. The robot may be adapted, for example, may be preprogrammed or structured to respond to commands from a human operator to move the removing apparatus 810, as described herein, to perform the functions of removing contact lenses from mold cups and placing contact lenses in lens processing trays. In one embodiment, removing apparatus 810 may be adapted to be directly manually operable to function as described herein. However, because of the highly repetitive nature of the functions of removing apparatus 810 and the relatively large number of contact lenses being produced and processed, at least some degree of automation in the operation of removing apparatus 10 is advantageous.

Each of the vacuum generators 822, 824, 826 and 828 can be controlled either manually or automatically, for example, by the robot, to provide or withdraw vacuum from the vacuum bodies 812, 814, 816 and 818, respectively, so as to allow removing apparatus 810 to perform its functions.

Each of the vacuum generators 822, 824, 826 and 828 advantageously involves a syringe-like assembly comprising, for example, a movable plunger which can be appropriately moved relative to the vacuum bodies 812, 814, 816, and 818, respectively, to create or dispel a vacuum in hollow spaces 832, 834, 836 and 838, respectively.

Figure 5A:
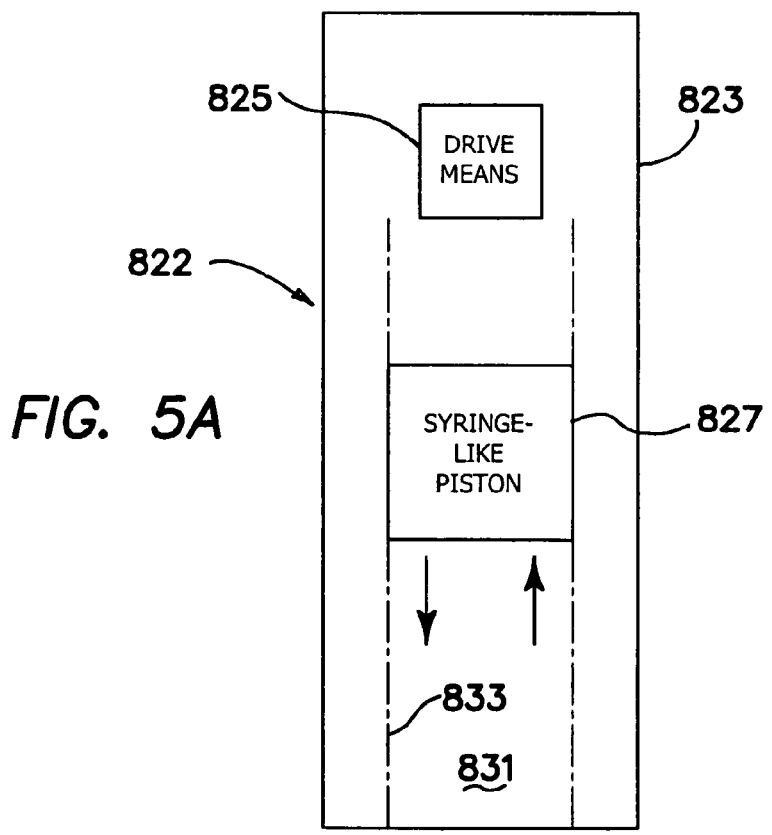
FIG. 5A is a schematic illustration of one of the vacuum generators of the removing apparatus shown in FIG. 1.

Vacuum generator 822 is schematically illustrated in FIG. 5A. Each of the other vacuum generators 824, 826 and 828 is structured identically to vacuum generator 822. As shown in FIG. 5A, vacuum generator 822 includes a housing 823, and a drive means or mechanism 825 and a syringe-like piston 827 in housing 823. Drive means 825 functions to controllably move syringe-like piston 827 up and down (as shown in FIG. 5A) within space 831 defined by inner wall 833. A substantially pressure tight seal is formed between piston 827 and wall 833.

A number of drive means 825 may be employed to move piston 827 to create or withdraw vacuum in hollow space 832 of vacuum body 812, as desired. For example, the piston 827 may be operated pneumatically, that is drive means 825 powered by air or other gas pressure; mechanically and/or electronically, such as through the use of a drive means 25 comprising an electrically driven motor, for example, a Servo motor and the like; other conventional and well-known drive means 825 and the like. In view of the conventional nature of many of the useful drive means, such drive means are not described in detail herein. For the sake of clarity, the drawings do not show wires, pipes and/or other means needed to power the individual vacuum generators 822, 824, 826 and 828. However, it is understood that such means are necessary in order to allow removing apparatus 810 to function, as described herein.

Again with reference to FIG. 5A, when it is desired to create a vacuum in hollow space 832 of vacuum body 812, drive means 825 is activated to cause piston 827 to move upwardly in space 831. When it is desired to withdraw the vacuum in 10 hollow space 832, drive means 825 is activated to cause piston 827 to move downwardly in space 831. If it is desired to provide a positive air pressure (that is an air pressure greater than atmospheric pressure) in hollow space 832 of vacuum body 812, drive means 825 is activated to cause piston 827 to move further downwardly in space 831.

With reference to FIGS. 6 to 10, the operation of removing apparatus 810 is described with specific reference to vacuum body 812. It should be understood, however, that the same mode of operation may be employed with vacuum bodies 814, 816 and 818. In addition, it is within the scope of the invention that each of the vacuum bodies 812, 814, 816 and 818 may be operated together, or may be operated independently, one from the other.

Vacuum bodies 812, 814, 816 and 818 are all structured identically. Thus, all references to the structure of vacuum body 812 apply equally to the structure of each of lens bodies 814, 816 and 818. The vacuum bodies 812, 814, 816 and 818 are preferably made of a polymeric component, for example, one or more acetyl copolymers, other suitable polymers and/or copolymers, for example, polyethylene, polypropylene, polytetrafluoroethylene, polyetheretherketone, and the like, and mixtures thereof. Alternatively, a metallic construction could be employed, for example, stainless steel, Hastelloy®, and/or other corrosion-resistant alloys.

Figure 7:
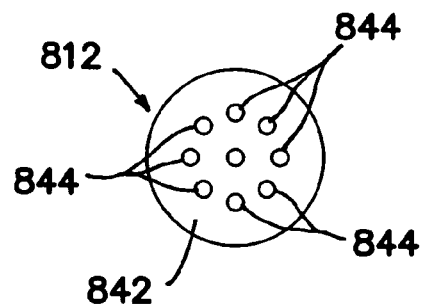
FIG. 7 is a plan view of the curved distal surface of the vacuum body shown in FIG. 6.

The distal curved surface 842 of vacuum body 812 is convex and is shown in plan in FIG. 7. Through holes 844 provide fluid communication between the hollow space 832 and the curved surface 842. As shown in FIG. 7, vacuum body 812 includes nine (9) of through holes 844 in a circular array with a central through hole 844. The through holes 844 extend radially outward from the center of surface 842 so that an effective portion, for example, at least about 10%, at least about 25%, or at least about 50%, and in some embodiments, a major portion, of the surface of the contact lens that is to be secured to the vacuum body is exposed to vacuum. This feature advantageously provides for a reduced amount of stress on the lens, thereby reducing the risk of damage or even loss of the lens as the lens is removed from the molding cup and placed in a tray for further processing using the removing apparatus 810. In addition, the relatively diffuse application of vacuum, for example, through a plurality of spaced apart through holes 844 to the contact lens, advantageously reduces the amount of water, from the partially hydrated contact lens, that passes into hollow space 832 during operation of removing apparatus 10. This reduced amount of water is relative to an identically structured system including only a single through hole for the application of vacuum to the contact lens surface. Having a reduced amount of water pass into hollow space 832 reduces the load on vacuum generator 822 and allows operation of system 810 with reduced maintenance and down time and, ultimately with reduced costs.

Figure 6:
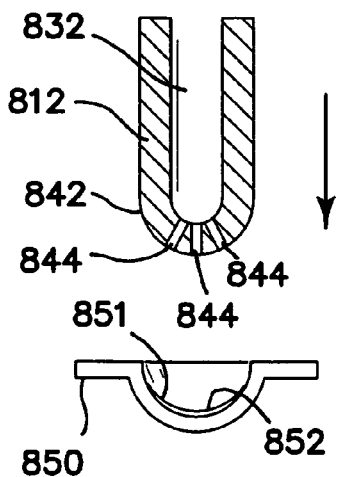
FIG. 6 is a cross-sectional view of one of the vacuum bodies of the removing apparatus shown in FIG. 1 preparing to remove a contact lens from a female molding cup.

As shown in FIG. 6, the vacuum body 812, included in or coupled to removing apparatus 810, is positioned directly above female molding cup 850 carrying a newly formed, partially hydrated hydrophilic polymeric contact lens 852. The female mold part or molding cup 850 is part of the mold in which the lens 852 was formed. Thus, there is some degree of adhesion between the molding cup 850 and lens 852 which needs to be overcome if the lens is to be removed from the molding cup 850.

The vacuum body 812 is moved into close proximity to the molding cup 850 so that the convex distal surface 842 is close to or in contact with the outwardly facing, concave surface 851 of contact lens 852. The convex distal surface 842 of vacuum body 812 substantially compliments at least a major portion of the concave surface 851 of contact lens 852.

Figure 8:
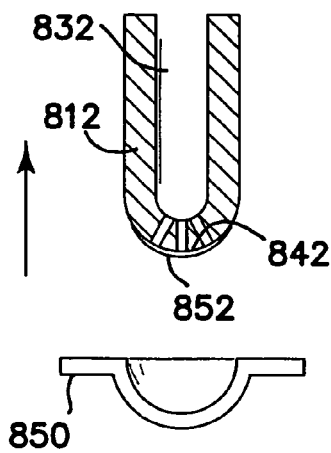
FIG. 8 is a cross-sectional view showing the vacuum body shown in FIG. 6 having picked up the lens from the molding cup.

As discussed elsewhere herein, vacuum generator 822 creates a vacuum in hollow space 832, which vacuum extends by way of through holes 844 to surface 851 of lens 852. Such vacuum is strong enough to overcome the adhesion of the contact lens 852 to the molding cup 850 so that, as shown in FIG. 8, the contact lens 852 adheres, by vacuum, to the convex distal surface 842 of vacuum body 812. Again as shown in FIG. 8, vacuum body 812 is withdrawn from mold cup 850 with contact lens 852 adhered to vacuum body 812.

Figure 9:
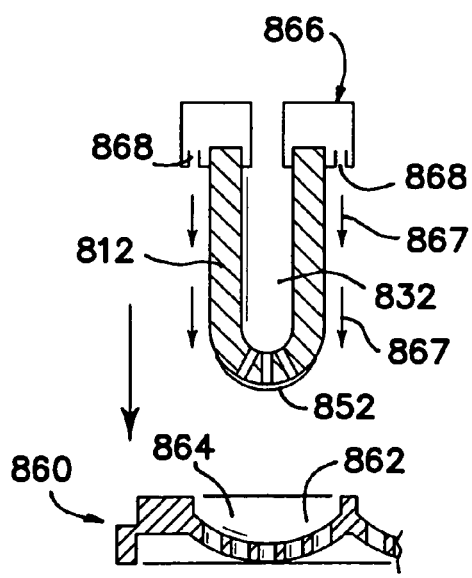
FIG. 9 is a cross-sectional view of the vacuum body shown in FIG. 6 with a contact lens attached to the vacuum body, and a contact lens processing tray.

Vacuum body 812 and adhered contact lens 852 are then moved to be directly above lens processing tray 860, as shown in FIG. 9. A preferred lens processing tray is described in detail elsewhere herein as another aspect of the present invention. Generally, lens processing tray 860 includes a concave surface 862 which at least partially defines a lens cup 864. Vacuum body 812 is then moved so that contact lens 852 is in close proximity to or in contact with concave surface 862. At this point, vacuum generator 822 operates, as described elsewhere herein, to withdraw the vacuum in hollow space 832. The absence of the vacuum causes lens 852 to fall into lens cup 864.

Optionally, vacuum generator 822 operates, as described elsewhere herein, to apply a positive pressure to hollow space 832 and, via through holes 844, to lens 852. In effect, this positive pressure forces lens 852 away from vacuum body 812 and into lens cup 864. Once lens 852 is in lens cup 864, vacuum body is withdrawn from processing tray 860, as shown in FIG. 10.

Turning back now to FIG. 9, another advantageous feature of the invention is shown for facilitating release of the lens from the vacuum body 812. Specifically, FIG. 9 shows a shroud element 866 disposed on a proximal portion of vacuum body 812, the shroud element 866 being effective to produce a cylinder of air flow in the direction of arrows 867. Shroud element 866 may comprise, for example a ring having multiple ports 868 disposed adjacent the body outer circumferential surface. The shroud element is structured to produce a cylinder of air flow substantially surrounding an outer circumferential surface of the vacuum body 812. Advantageously, when lens 852 is being released into tray 860, the "air shroud" or air cylinder provides a barrier around the circumference of the lens. The air shroud 866 is effective to maintain the lens in substantially flat position as the lens drops into the tray depression 862. Without provision of the air shroud feature of the invention, there is a higher likelihood that the released lens will fold, twist or slide along the vacuum head, for example, due to surface tension of water on the lens.

Turning back to FIG. 10, once the lens 852 has been released into tray 860, vacuum body 812 is now available to remove an additional contact lens from a molding cup. This operation can be repeated, as needed, with different contact lenses.

It should be noted that the distal end surface of the vacuum body 812 has a generally convex configuration. As such, vacuum body 812 is very useful for removing lenses from a female portion of a mold, such as female mold cup 850.

Figure 11:
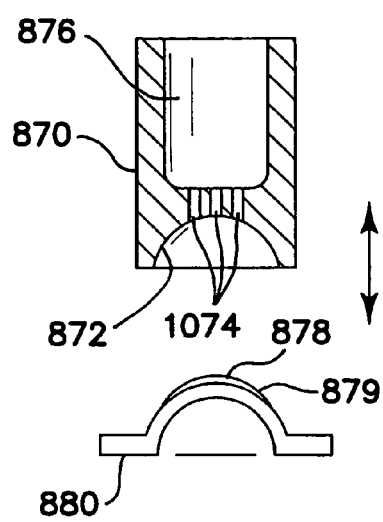
FIG. 11 is a cross-sectional view of an alternate embodiment of a vacuum body in accordance with the present invention preparing to remove a contact lens from a male molding part.

In situations where the contact lens is located on and/or adhered to a male mold cup, an alternate vacuum body 870, shown in FIG. 11, may be employed. Except as expressly described herein, alternate vacuum body 870 is structured and functions in substantially the same manner as does vacuum body 812. Also, it should be noted that alternate vacuum body 870 may be used in conjunction with a series of such vacuum bodies, for example, in an apparatus substantially similar or analogous to removing apparatus 810.

Vacuum body 870 includes a distal surface 872 which is generally concave. Through holes 874 extend from hollow space 876 to surface 872.

Figure 12:
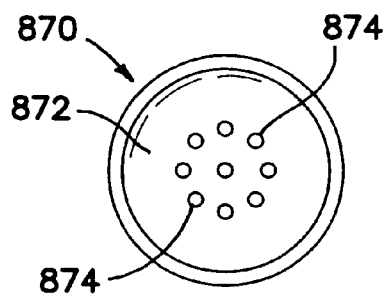
FIG. 12 is a plan view of the distal end of the alternate vacuum body shown in FIG. 7.

As shown in FIG. 12, vacuum body 870 includes a series of nine (9) through holes 874 positioned in a circular array with a single through hole 870 through the center of distal surface 872.

Figure 13:
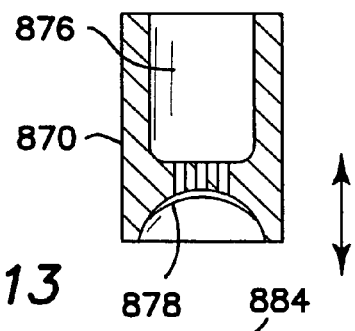
FIG. 13 is a cross-sectional view showing the alternate vacuum body holding a contact lens and preparing to place the lens in a lens processing tray.

As shown in FIGS. 11 and 13, alternate vacuum body 870 may be advantageously employed to remove a partially hydrated hydrophilic polymeric contact lens 878 from male molding cup or part 880. Contact lens 878 includes an outwardly facing surface 879 which is generally convex. Concave surface 872 of alternate vacuum body 870 generally complements convex surface 879 of contact lens 878.

As shown in FIG. 11, vacuum body 870 is placed directly above male molding part 880 carrying contact lens 878. Vacuum body 870 is then moved so that surface 872 is in close proximity to or in contact with surface 879 of lens 878. At this point, a vacuum generator, such as vacuum generator 822, coupled to alternate vacuum body 870, is operated, as described elsewhere herein, to provide a vacuum in hollow space 876 and via through holes 874 to surface 872. Such vacuum is sufficient to overcome any adhesion and/or other securement forces between the contact lens 878 to the male mold part 880. The contact lens 878 becomes adhered to the vacuum body 870 and the vacuum body 870 together with contact lens 878 are withdrawn from the mold part 880.

As specifically shown in FIG. 13, the vacuum body 870 with the contact lens 878 adhered thereto is moved and positioned directly above a contact lens processing tray 82 which includes a convex surface 884. The vacuum body 870 is moved so that the contact lens 878 is in close proximity to or even in contact with surface 884. At this point, the vacuum generator associated with vacuum body 870 is operated, as described elsewhere herein, to withdraw the vacuum in hollow space 876 and apply a positive pressure to hollow space 876 so that the adhesion between the contact lens 878 and the vacuum body 870 is overcome and the lens 878 falls onto convex surface 884. The vacuum body 870 is then withdrawn from the tray 882 and is available for further use to remove other lenses from other male molding parts, as described above.

Figure 14:
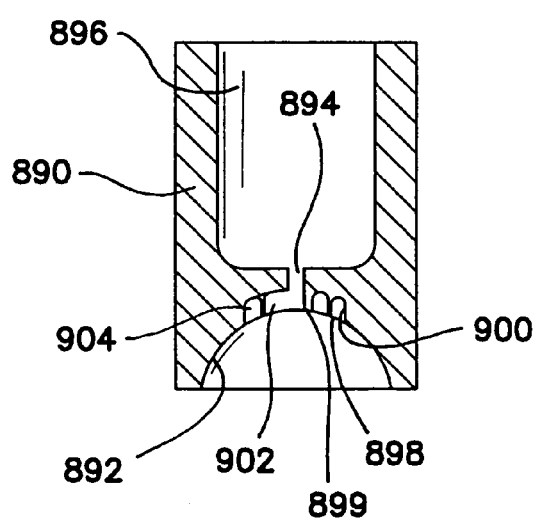
FIG. 14 is a cross-sectional view of a further embodiment of a vacuum body in accordance with the present invention.
Figure 15:
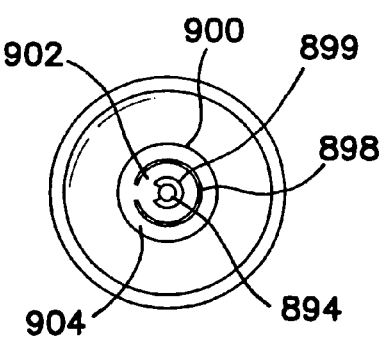
FIG. 15 is a plan view of the distal end of the further vacuum body shown in FIG. 14.

A further embodiment of the present removing apparatus is shown in FIGS. 14 and 15. It should be noted that further vacuum body 890 may be used in place of the vacuum bodies 812, 814, 816 and 818, in removing apparatus 810 shown in FIG. 5.

Further vacuum body 890 includes a distal surface 892 which is generally concave. A single through hole 894 provides fluid communication between hollow space 96 and distal surface 892.

Further vacuum body 890 includes a ridge 898 which extends radially outwardly from through hole 894 and partially surrounds through hole 894. A central ridge 899 partially defines through hole 894 and partially surrounds through hole 894. Ridges 898 and 899 both extend to the distal surface 892 of further vacuum body 890. The surface 892 includes an inner edge 900. The combination of the inner edge 900, ridges 898 and 899, and through hole 894 form two recessed channels 902 and 904 in further vacuum body 890. Channels 902 and 904, which are in mutual fluid communication, are effective to provide or transmit or receive a vacuum generated in hollow space 896 via through hole 894. In other words, the channels 902 and 904 are effective to diffuse the vacuum from through hole 894 over a relatively large portion of the area defined by distal surface 892.

Further vacuum body 890 functions in a substantially similar manner to alternate vacuum body 870 to remove a contact lens from a male mold part and place the contact lens in a processing tray, as described herein. However, instead of using a series of through holes, such as through holes 874 in alternate vacuum body 870, further vacuum body 890 uses a single through hole 894 and channels 902 and 904 to diffuse the vacuum over a major portion of the contact lens being removed from the male mold part.

Other configurations of through holes in vacuum bodies such as those vacuum bodies described herein, are contemplated and are considered to be included within the scope of the present invention.

In another aspect of the present invention, newly formed, swellable, polymeric contact lenses, for example, such lenses containing a hydrophilic, silicon-containing polymeric material, are now processed, typically using one or more liquids, to prepare the lenses for packaging and shipment. These lenses, which have been recently removed from molding cups, for example using the removing apparatus 10 described and shown elsewhere herein, include unreacted monomers, and possibly other extractable material, which are to be removed from the lenses before the lenses can be packaged for shipment/sale.

Figure 16:
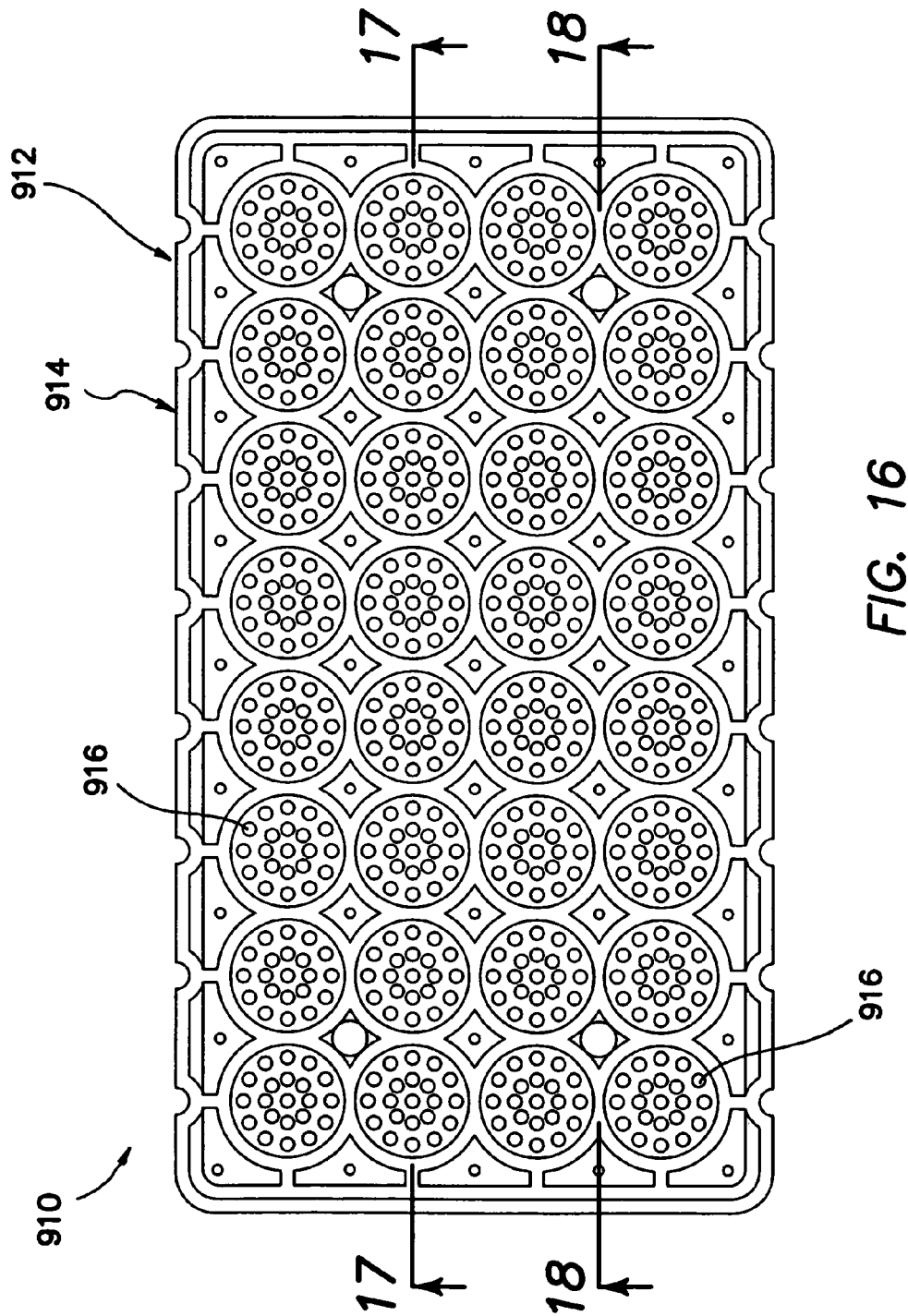
FIG. 16 is a top plan view of a holding apparatus in accordance with another aspect of the invention.

Turning now to FIG. 16, each newly removed lens is preferably placed in a holding apparatus 910 of the present invention, and is held therein during such liquid processing steps, for example, processing steps directed at extraction of unreacted monomers and hydration of lenses. Thus, lens processing tray 860 shown in FIG. 9, is preferably substituted with holding apparatus 910 of the present invention.

Generally, a plurality of newly formed lenses are held within the holding apparatus 910 while the lenses are contacted with one or more liquid compositions during several stages of processing. The present holding apparatus 910 are structured to be effective to obtain significant mass transfer of liquids to the lenses and advantageously provide cost effective and efficient treatment of the lenses.

In the embodiment shown, holding apparatus 910 comprises a tray set 912 including an arrangement of cells 916, each cell 916 being configured to contain an individual contact lens.

Figure 17:
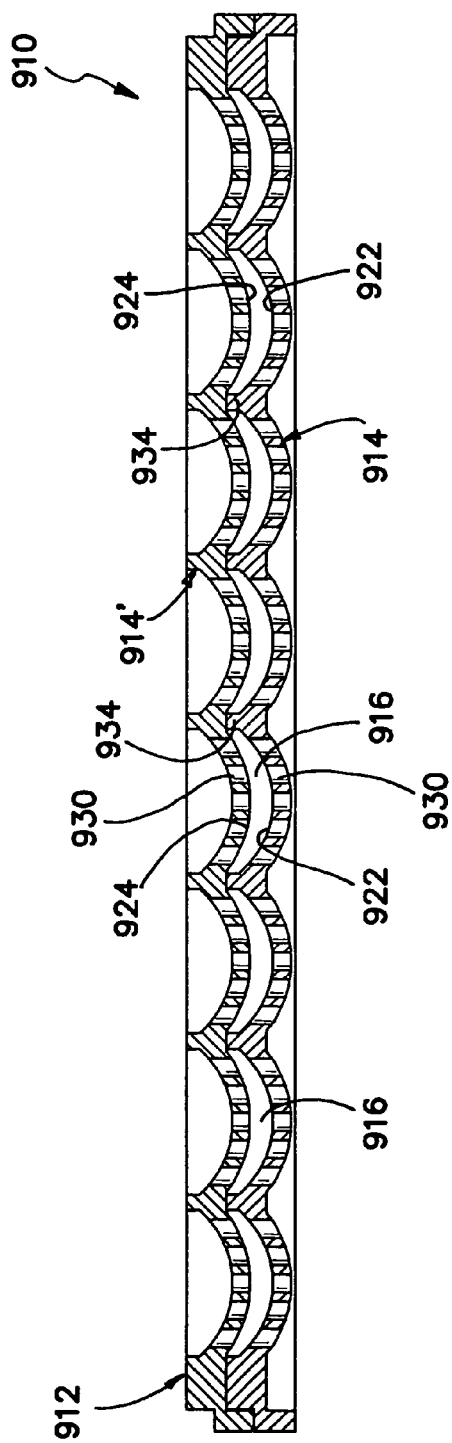
FIG. 17 is a cross-sectional view of the holding apparatus shown in FIG. 16 taken along line 17-17.
Figure 18:
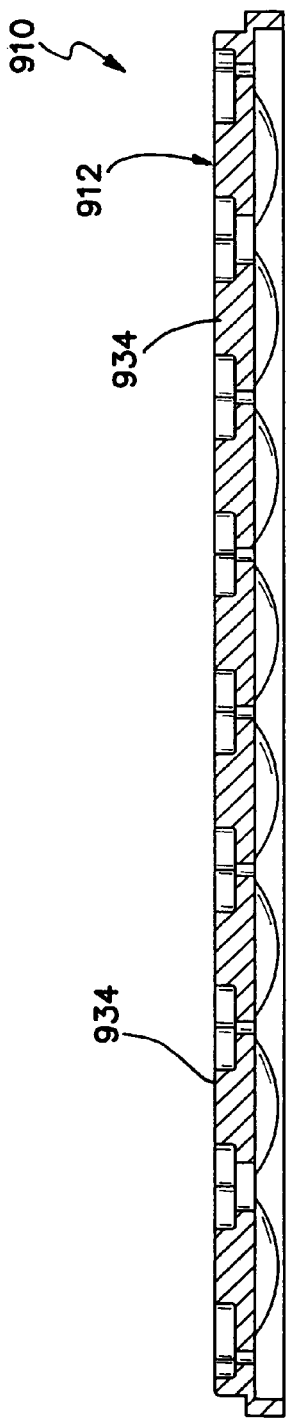
FIG. 18 is a cross-sectional view of the holding apparatus shown in FIG. 16 taken along line 18-18.

The structure of tray set 912 may be more clearly understood with reference to cross-sectional views of the tray set 912 in FIGS. 17 and 18. The tray set 912 comprises a plurality of trays 914, 914', each tray 914, 914' being structured to be couplable to another of the trays 914, 914'. More specifically, each tray set 912 may comprise two (2) trays 914, 914' for example, two (2) identical, or substantially identical trays 914, 914' stacked one on the other. For the purposes of the instant description, trays 914 and 914' are given different numerical indicators in FIG. 17 though they are identical in structure.

Each tray 914, 914' includes a plurality of spaced-apart cell walls 922 and a plurality of spaced-apart cover walls 924. Each cell 916 may be a contact lens shaped space defined between an individual cell wall 922 and a substantially opposing individual cover wall 924.

Each cell wall 922 (for example, cell wall 922 of tray 914) is sized and adapted to at least partially define a space, e.g. cell 916, to carry a contact lens to be processed. Each cell wall 922 is structured to allow processing fluid to pass through the space or cell 916 to contact the contact lens located therein.

Similarly, each cover wall 924 (for example cover wall 916 of tray 914') is sized and adapted to cover a substantially opposing cell wall 922 of tray 914 coupled to tray 914' and thereby to confine a contact lens carried in a space or cell 916. Each cover wall 924 is structured to allow processing fluid to pass through the cell 916 when tray 914 is coupled to tray 914'.

For example, each of the cell walls 922 and each of the cover walls 924 include at least one through hole 930. In the embodiment shown, each of the cell walls 922 and each of the cover walls 924 include a plurality of through holes. As shown, the through holes 930 of the cell wall 922 are aligned with, or substantially aligned with, the through holes 930 of the cover wall 924 when tray 914 is coupled to tray 914'. The through holes 930 are very effective in providing for the processing fluid to have access and flow through the space or cell 916 to contact the lens located therein. Such access is highly advantageous to provide for mass transfer, for example, extraction between the lens within such space or cell 916 and the fluid passing through such space or cell 916.

In the embodiment shown, each of the cell walls 922 is generally concave and each of the cover walls 924 is generally convex. However, the opposite arrangement may also be employed. That is, each of the cell walls may be generally convex and each of the cover walls may be generally concave. When the trays 914 and 914' are coupled together, each of the cell walls 922 is located in a substantially opposing position relative to a different one of the cover walls 924. In addition, each of the trays 914 may include a series of partitions 934 with each partition 934 providing means for coupling and/or aligning the cell walls 922 of one tray 914 with the cover walls 924 of the other try 914'. Configuration of the partitions 934 are also shown in detail in FIG. 18.

The number of cell walls 922 and cover walls 924 included in each of the trays 914 may vary over a wide range. The cells 916, for example at least partially defined by cell walls 922 and cover walls 924, may be arranged in an array or other specific pattern, for example, a rectangular array as shown in FIG. 16. Alternative cell arrangements may include a square array, or any other suitable geometric configuration array. In one aspect of the invention, each of the trays 914 includes about 20 to about 100 cell walls and about 20 to about 100 cover walls. Preferably, each of the trays 914 includes about 25 to about 65 cell walls and about 25 to about 65 cover walls.

The cells 916 of the trays 914, that is the spaces defined between individual cell walls of one tray 914 and individual cover walls of another tray 914' when the two trays 914, 914' are coupled together, are advantageously designed so that lens movement within each cell 916 is restricted during processing to prevent the lenses in the cells 916 from folding and/or becoming damaged. As shown, the cells 916 are perforated to allow fluid ingress and egress around a lens located in the cell 916.

The tray design may include features that minimize the transfer of processing fluid from one processing stage to another. For example, multiple apertures 918 between the lens-holding cells 916 may be provided for enhancing drainage of trapped fluids from the trays. Apertures 919 are provided for facilitating automated handling of the tray 914.

Tray 914 and tray 914' are structured identically. Thus each reference to the structure of tray 914 applies equally to tray 914'. In a preferred embodiment of the invention, tray 914 is manufactured so as to be substantially unaffected by the conditions and materials used to process contact lenses being carried in the cells of the trays. For example, the tray 914 is made of materials that render the tray 914 substantially resistant to degradation by frequent contact with alcohols, for example, alcohols such as methanol, ethanol and the like and mixtures thereof. In one very useful embodiment, the tray 914 is substantially resistant to ethanol. For example, the tray 914 may comprise a polymeric material, for example, polypropylene homopolymer and the like polymeric materials, or other material suitable for use in an alcohol, e.g., ethanol-containing environment. In, addition, the tray 914 is preferably designed so as to have a low attenuation of ultrasonic energy which may be used during the fluid processing of the contact lenses to facilitate agitation of the fluids used in such processing. Such agitation or movement of the fluid facilitates mass transfer between the lenses and the processing fluids. The tray 914 may be a unitary, single piece of polymeric material, for example molded plastic.

Figure 19:
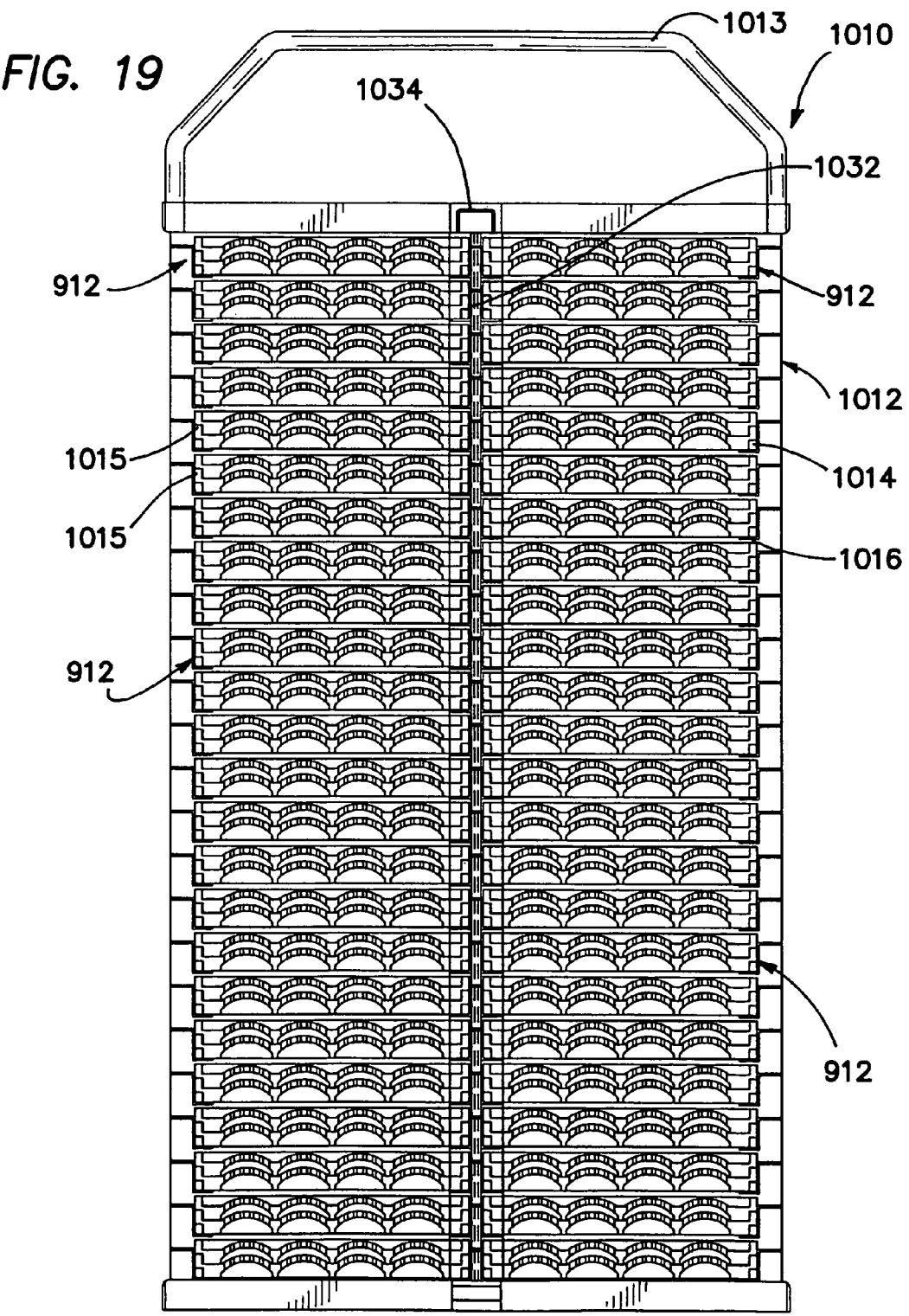
FIG. 19 is a side elevation view of a system for holding a plurality of contact lenses for facilitating handling and/or processing of the lenses, in accordance with another aspect of the present invention, the system including a plurality of the holding apparatus shown in FIGS. 16-18.

Turning now to FIG. 19, a system 1010 in accordance with an embodiment of the invention, for containing a large number of newly formed lenses during fluid processing is shown, in which the system 1010 includes a tray set carrier 1012 configured to contain a plurality of the tray sets 912 in a stacked configuration. The system 1010 in accordance with this embodiment may include a plurality of tray sets 912, a tray set carrier 1012, and a plurality of carried contact lenses. For example, referring back briefly to FIG. 17, each carried contact lens is located in a cell 916 between one cell wall 922 of one of the trays 914 and one cover wall 924 of the other of the trays 914' of tray set 912. In one embodiment of the invention, the system 1010 comprises plurality of distinguishable tray sets, for example, mechanically or visually distinguishable trays or sets of trays, a tray set carrier 1012, and a variety of different batches of contact lenses, said each batch being distinguishable by its placement within a distinguishable tray set.

The tray set carrier 1012, preferably with the tray sets 912 and contact lenses, is structured to be portable. For example, such tray set carrier 1012 is sized and adapted to be manually, automatically, or robotically moved from place to place, for example, from one contact lens processing stage to another. Typically, the tray set carrier 1012, fully loaded with newly formed lenses, is submerged in containers of one or more different processing liquids for a desired period of time. Thus, it is advantageous that the system 1010 is designed to enable easy lifting and transport between different contact lens processing stages. In some embodiments of the invention, features that enable automated, machine handling, for example robotic handling of tray sets 1012 may be provided. For example, in the embodiment shown, the system 1010 is designed to enable robotic lifting and transport between different stages of processing. For example, bars 1013 at the top of the carrier 1012 are structured to allow a gantry-style robot to transport the carrier 1012 through the extraction and hydration process typically comprising a series of tanks containing solution.

The tray set carrier 1012 is preferably structured to enhance lightness, strength and rigidity. For example, the tray set carrier 1012 is made of a stainless steel construction. Even more specifically, the tray set carrier 1012 may be made of electro-polished stainless steel, about grade 316 or equivalent. This material will not corrode in either a solvent of deionized water environment. Advantageously, the stainless steel construction of the tray set carrier 1012 provided negative buoyancy to ensure that the trays held therein are fully submerged in solution during the treatment process steps.

In the embodiment shown, the tray set carrier 1012 includes a series of compartments 1015, each compartment being configured to hold one tray set 912. In the shown embodiment, the carrier 1012 is configured to hold fortyeight (48) tray sets 912, wherein each tray set 912 holds thirty-two (32) contact lenses. The tray set carrier 1012 is structured so as to allow each tray set 912 to be slidably received within one of the compartments, for example, by means of brackets 1014 which engage peripheral edges of the tray sets 912.

More specifically, the brackets 1014 include runners 1016 for holding each tray set 912 is a suspended position in the tray set carrier 1012. For example, a pair of spaced apart brackets 1014 are provided within each compartment. The brackets 1014 are structured to engage peripheral edges of an individual tray set 912, in a manner that leaves the cells of the tray set 912 open to exposure to processing fluids within the tray set carrier 1012. Runners 1016 of brackets 1014 retain the tray sets 912, for example at a tolerance sufficient to minimize separation or opening of a tray set 912 positioned in the compartment 1015, while still allowing the tray set 912 to be easily slid into the compartment. Each compartment is separated from each adjacent compartment by the runners 1016 such that the extraction and hydration fluid, or other processing fluid, can reach the top and bottom surfaces of all the trays and all the lenses held therein, for example when the filled tray set carrier 1012 is in the processing fluid. The system 1010 is structured and designed to allow effective fluid transfer between the lenses. Typically, a gap between each compartment measures about 1.0 to about 3.0 mm. The gap between tray pairs is defined by the gauge (thickness) of the stainless steel used for the runners 1016.

The tray set carrier 1012 may include a suitable retention device 230 for preventing the trays 914 or tray sets 912 from sliding out of the compartments 1016 during movement and handling of the carrier 1012, for example between processing stages. For example, the retention device 1030 may comprise a strap, for example a hinged strap 1032, and a catch 1034 for coupling to the strap 1032. The catch 1034 is preferably positioned near a top portion of the tray set carrier 1012. The retention device 1030 is structured such that when the tray set carrier 1012 is being loaded or unloaded, the hinged strap 1032 folds flat and out of the way. In FIG. 19, the strap 1032 is shown on the front view in the center of the carrier 1012, the strap 1032 being in an engaged position for securing the tray sets 912.

In another aspect of the present invention, the plurality of trays 914 includes different series of trays, with each series of trays being distinguishable from the other series of trays. Such distinction may be employed to facilitate identifying different contact lenses being carried in each series of trays 114.

For example, the distinctions between the different series of trays 914 may be visually identifiable. For example, the plurality of trays may include different series of trays 914 with each series of trays having a different color. The distinction between the different series of trays 914 may be mechanical distinctions or structural distinctions.

Figure 20:
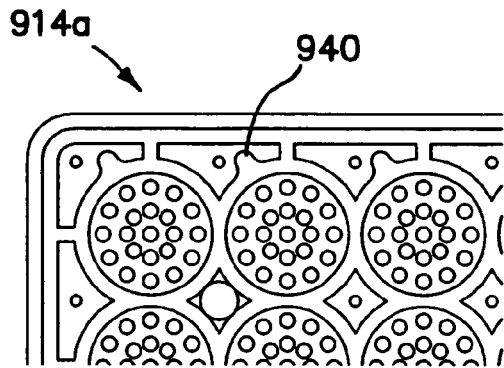
FIGS. 20, 21 and 22 each show a portion of a tray of the holding apparatus of the present invention, wherein each of the trays includes a different feature for facilitating distinguishing the tray from other trays.
Figure 21:
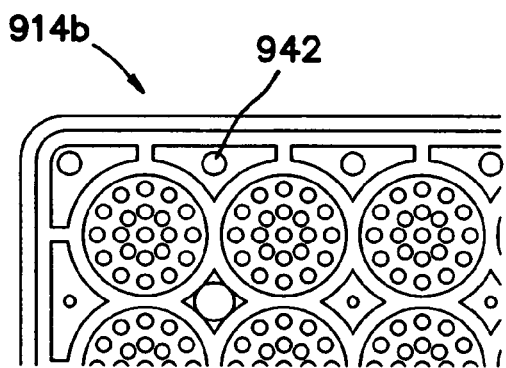
Figure 22:
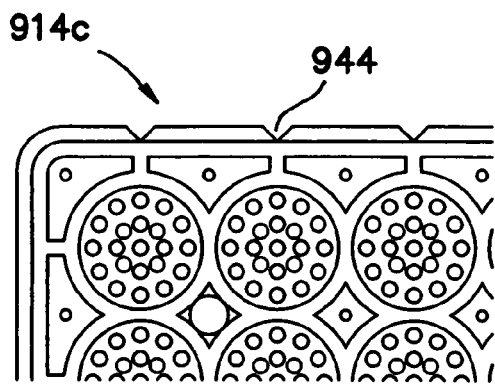

For example, turning now to FIGS. 20, 21 and 22, each series of trays may have one or more of a differently shaped notch, for example, a peripheral notch, one or more extra, e.g., raised portions, one or more extra holes or indents, and the like mechanical/structural distinctions, and combinations of such distinctions. More specifically, the tray 914a in FIG. 20 includes a raised feature 940 which provides a visually identifiable distinction of the tray 914a when the tray 914a is compared to another tray that does not include such visually identifiable distinction.

In FIG. 21, a tray 914b is shown which includes a visually identifiable hole or aperture 942 for purposes of visual distinction. In FIG. 22, the tray 914c includes a notch feature 944 which is a visually distinguishing feature of the tray 914c. Other visually and mechanically distinguishing features of the trays 914 may be provided which are not listed herein, and which are considered to be within the scope of the present invention. In addition, a single tray or tray set may have one or more visually identifiable distinctions and, separated, one or more mechanical/structural distinctions.

Advantageously, the distinctions between the different trays and sets of trays are automatically monitorable to facilitate identifying any one tray, or set of trays, from the other, different trays or sets of trays. The ability to identify or distinguish one tray or tray set from another tray or tray set reduces the risk that the contact lenses being carried by any tray or tray set will be mischaracterized or misidentified.

EXAMPLE

A tray of mold assemblies, each assembly containing a newly cured contact lens product, is received in a loading station. From the tray, pairs of mold assemblies are removed and placed in a nest located on a rotating disc. The pairs of mold assemblies are moved between various processing stations while they remain in the nest.

Each mold assembly is moved to a dipping assembly where the mold assembly is placed into a liquid bath containing deionized water at a temperature of 75° C. Ultrasound is radiated through the liquid bath to facilitate decoupling of the mold sections. The mold assembly is substantially entirely immersed in the liquid bath. Alternatively, the mold assembly is dipped in the liquid bath so that at least the mold section that includes the concave lens shaped surface (i.e. the "lens cup") is in contact with the liquid. The mold assembly remains in the liquid for about 7 seconds. This liquid bath process functions to break or defuse bonded regions between the first mold section and the second mold section. In addition, the dipping of the female mold section may facilitate the lens product adhering to the lens cup, rather than the convex lens shaped surface of the male mold section. In addition, the heat of the water helps release extractables from the lens and/or enhances lubricity of the lens.

After the 7 second bath, the mold assembly is removed from the liquid and is transferred to a splitter assembly. Although the welds between the mold sections have been substantially or completely destroyed by the liquid bath, the mold sections are still adhered to one another. Each pair of molds is placed in a carrier which holds the molds without clamping the molds. The splitting or separation of the mold sections occurs by the splitter assembly prying the mold sections apart from one another.

In particular, the carrier of the pair of mold assemblies is located on a track. The splitter assembly includes a block containing three blade assemblies (left, center, and right). The left and right blade assemblies each comprise a single wedge shaped blade and the center blade assembly comprises two opposing wedge shaped blades. Thus, the three blade assemblies define two channels, each channel configured to receive a single mold in one of the carriers. Each of the blades is wedge shaped in that the blade is very thin at the front end and thicker at the rear end. It is tapered from end to end. The blade pitch goes from about 0.5 mm to 3.5 mm over a length of about 10 inches.

The carrier slides the molds along the blade. The front end of the blade contacts the mold assembly and passes between the mold sections. As the carrier and mold assemblies carried thereby are advanced toward the back of the blade assemblies, the top mold section (the male mold section) is separated from the bottom mold section (he female mold section). Any residual monomer mixture located on the flange of the mold sections, i.e. about the edge of the contact lens, remains adhered to the top mold section and is removed therewith. After the spitting process, the top mold section is resting on the bottom mold section with the lens disposed therebetween.

A robotic arm clasps the top mold section and discards it.

The lower mold sections each containing a lens are then immersed in a fluid bath. The fluid bath is 75 C deionized water with optional ultrasound transmitted through the fluid. The elevated temperature helps to control germ development and contamination of the lenses. The fluid causes the lens to be released or uncoupled from the mold section, in part by causing the lens to swell. The swelling or expansion of the lens body essentially pops the lens off of the surface of the lens cup. Other fluids that may be used to expand the lens to release the lens from the molding surface include alcohol, acetic acid, 20% IMS/80% water, change in pH, change in salt concentration.

In this station, the fluid may become contaminated over time with unpolymerized monomers, although, this step is not a true extraction of all unpolymerized monomers. Thus, the fluid of this bath is filtered through a carbon filter, a particle filter, and a chemical filter. The water is also passed by a UV lamp to reduce contaminants in water.

Next, a robotic arm clamps the mold sections and lenses and tips the mold sections forward so that the water drips from the lens cup into the water bath. The lens slides forward just off-center of the lens cup.

When clamped, the mold can pass through an optional reader to make sure the lens is properly identified and is going to the correct location. Other readers, for example, UPC symbols or other indicia on the mold section may be provided and utilized for the purpose of ensuring correct identification of lenses throughout various stages of the process.

A vacuum head, such as in accordance with the certain aspects of the invention and described elsewhere herein, is lowered to contact the lens and draw the lens onto the vacuum head. The vacuum head has a plurality of vacuum ports. In this step, four vacuum heads approach four lens cups at about a 10 degree to about 15 degree angle so that the vacuum head is substantially normal to the position of the concave surface of the lens due to the tipping of the lens during liquid dispense. An air shroud is provided along the outer circumference of the vacuum head to help keep the lens in a desired position on the vacuum head during release. The shroud is, in a sense, a cylinder of air coming down around the vacuum head. Without the shroud, the possibility for the lens to fold invert or slide up the vacuum head due to surface tension of water is greater when the lens is released from the vacuum head.

The lens is removed from the vacuum head and placed into a tray. The trays are color coded to contrast with the lens so the lens can be seen. The trays have wells with holes for facilitating downstream extraction processes. Each tray containing the lenses is covered with a lid and is moved to downstream process stages.

Certain aspects and advantages of the present invention may be more clearly understood and/or appreciated with reference to the following commonly owned United States Patent Applications, filed on even date herewith, the disclosure of each of which is being incorporated herein in its entirety by this specific reference: U.S. Pat. application Ser. No. 11/200,848, entitled "Contact Lens Molds and Systems and Methods for Producing Same"; U.S. patent application Ser. No. 11/200,648, entitled "Contact Lens Mold Assemblies and Systems and Methods of Producing Same"; U.S. patent application Ser. No. 11/200,644, entitled "Systems and Methods for Producing Contact Lenses from a Polymerizable Composition"; U.S. patent application Ser. No. 11/200,863, entitled "Contact Lens Extraction/Hydration Systems and Methods of Reprocessing Fluids Used Therein"; U.S. patent application Ser. No. 11/200,862, entitled "Contact Lens Package"; U.S. Patent Application No. 60/707,029, entitled "Compositions and Methods for Producing Silicone Hydrogel Contact Lenses"; and U.S. patent application Ser. No. 11/201,409, entitled "Systems and Methods for Producing Silicone Hydrogel Contact Lenses".

A number of publications and patents have been cited hereinabove. Each of the cited publications and patents are hereby incorporated by reference in their entireties.

While this invention has been described with respect to various specific examples and embodiments, it is to be understood that the invention is not limited thereto and that it can be variously practiced within the scope of the following claims.

What is claimed is:

1. A method of producing a silicone hydrogel contact lens, comprising:
providing a contact lens mold assembly comprising a first mold section fused to a second mold section, wherein said first and second mold sections comprise an ethylene vinyl alcohol resin, and a polymerized silicone hydrogel lens shaped article disposed between the first mold section and the second mold section;
immersing the contact lens mold assembly in an immersion liquid having a temperature of between about 20° C. to about 95° C. for a period of time sufficient to initiate separation of the mold sections;
removing the contact lens mold assembly comprising the first mold section fused to the second mold section from the immersion liquid;
separating the fused first and second mold sections after the immersing step using one or more wedge-shaped elements to pry apart and separate the fused first and second mold sections so that the lens shaped article is adhered to a lens defining surface of one of the separated mold sections; thereafter
contacting the mold section and the polymerized silicone hydrogel lens shaped article adhered thereto with a heated soaking liquid to release the lens shaped article from the lens defining surface of the mold section; and
removing the released lens shaped article from the mold section, wherein the contact lens mold assembly is immersed in the immersion liquid for about 1 second to about 10 seconds.

2. The method of claim 1, wherein the heated soaking liquid is selected from the group consisting of water, alcohol, acetic acid, and combinations thereof.

3. The method of claim 1, wherein the step of contacting comprises contacting the mold section and the polymerized silicone hydrogel lens shaped article adhered thereto with the heated soaking liquid to release the lens shaped article from the lens defining surface of the mold section while ultrasonic energy is being transmitted through the heated soaking liquid.

4. The method of claim 1, wherein the heated soaking liquid is water provided at a temperature no greater than about 100° C.

5. The method of claim 4, wherein the heated soaking liquid comprises deionized water at a temperature of about 75° C.

6. The method of claim 1, further comprising extracting extractable materials from the lens shaped article to produce an extracted lens; hydrating the extracted lens to produce a hydrated silicone hydrogel contact lens; and packaging the hydrated silicone hydrogel contact lens.

7. The method of claim 1, wherein the released lens shaped article is removed from the mold section using a vacuum apparatus, wherein the vacuum apparatus comprises a body at least partially defining a hollow space, the body having a surface sized and adapted to face a contact lens when the body is placed in proximity to the released lens shaped article when the released lens shaped article is present on the lens defining surface of the mold section, at least one through hole extending from the surface to the hollow space, and at least one channel extending from the surface into the body and not to the hollow space and being effective to diffuse vacuum from the at least one through hole over a portion of the surface, and wherein the body is placed in proximity with the released lens shaped article present on the mold section during the removing.

8. The method of claim 7, wherein the removing comprises moving the released lens shaped article from the mold section to a lens tray using the vacuum apparatus.

9. The method of claim 7, wherein the at least one channel extends only partially through the body.

10. The method of claim 7, wherein the at least one channel is in fluid communication with the at least one through hole.

11. The method of claim 1, wherein the immersion liquid is water.

* * * * *